US008123664B2

(12) United States Patent
Lokken et al.

(10) Patent No.: US 8,123,664 B2
(45) Date of Patent: Feb. 28, 2012

(54) SEAT

(75) Inventors: Michael Warren Lokken, Grove City, MN (US); Wesley Lee Ovre, Redwood Falls, MN (US); Jeffrey Vernon Schmidt, Redwood Falls, MN (US); Mathew Allan Haugen, Hector, MN (US); Leo Joseph Schweiss, Fairfax, MN (US)

(73) Assignee: Invacare Corp., Elyria, OH (US)

( * ) Notice: Subject to any disclaimer, the term of this patent is extended or adjusted under 35 U.S.C. 154(b) by 0 days.

(21) Appl. No.: 12/354,992

(22) Filed: Jan. 16, 2009

(65) Prior Publication Data

US 2009/0186747 A1 Jul. 23, 2009

Related U.S. Application Data

(60) Provisional application No. 61/022,588, filed on Jan. 22, 2008.

(51) Int. Cl.

| | |
|---|---|
| ***A63B 26/00*** | (2006.01) |
| ***A47C 1/00*** | (2006.01) |
| ***A61G 15/00*** | (2006.01) |
| ***B60N 2/00*** | (2006.01) |
| ***B60N 2/02*** | (2006.01) |

(52) U.S. Cl. ......................... 482/142; 297/311; 297/313

(58) Field of Classification Search .................. 482/142, 482/51, 66–68, 95–96; 297/313, 330, 344.1, 297/344.12, 344.14, 344.15–344.17, DIG. 10, 297/5–6, 68, 71, 75, 215.13, 311, 337–338; 601/5, 23–24, 26; 135/65, 67; 280/87.01, 280/87.021, 87.03, 87.041, 87.042, 87.043, 280/87.05, 87.051

See application file for complete search history.

(56) References Cited

U.S. PATENT DOCUMENTS

| | | | | |
|---|---|---|---|---|
| 481,040 | A | 8/1892 | Longanecker | |
| 1,731,375 | A | 10/1929 | Engers | |
| 1,858,103 | A | 5/1952 | Menon | |
| 3,023,048 | A | 2/1962 | Barton | |
| 3,322,460 | A | 5/1967 | Leverman | |
| 3,964,786 | A | 6/1976 | Mashuda | |
| 4,054,319 | A | 10/1977 | Fogg, Jr. et al. | |
| 4,249,774 | A * | 2/1981 | Andreasson | 297/311 |
| 4,456,086 | A | 6/1984 | Wier et al. | |
| 4,545,616 | A | 10/1985 | Booth | |
| 4,555,121 | A | 11/1985 | Lockard et al. | |

(Continued)

FOREIGN PATENT DOCUMENTS

EP 1859765 11/2007

(Continued)

OTHER PUBLICATIONS

Office action from U.S. Appl. No. 11/247,961 dated Sep. 30, 2008.

(Continued)

*Primary Examiner* — Loan Thanh

*Assistant Examiner* — Oren Ginsberg

(74) *Attorney, Agent, or Firm* — Calfee, Halter & Griswold LLP

(57) ABSTRACT

Seats that are moveable from a seating orientation, which allows a user to sit on the seat, to a standing orientation, where the seat at least partially supports the user in a standing posture are disclosed. At least a portion of the seat is moveable away from the user's legs when the seat is in the standing position.

23 Claims, 40 Drawing Sheets

U.S. PATENT DOCUMENTS

| | | | | |
|---|---|---|---|---|
| 4,569,094 | A | | 2/1986 | Hart et al. |
| 4,569,556 | A | | 2/1986 | Pillot |
| 4,632,455 | A | | 12/1986 | Schiller et al. |
| 4,725,056 | A | | 2/1988 | Rehrl et al. |
| 4,732,402 | A | | 3/1988 | Lambert |
| 4,741,547 | A | | 5/1988 | Tholkes |
| 4,744,578 | A | | 5/1988 | Stearns |
| 4,802,542 | A | | 2/1989 | Houston et al. |
| 4,809,804 | A | | 3/1989 | Houston et al. |
| 4,861,059 | A | | 8/1989 | Shirk |
| 4,890,853 | A | | 1/1990 | Olson |
| 4,915,373 | A | | 4/1990 | Walker |
| 4,968,050 | A | | 11/1990 | Kenrick et al. |
| 5,054,852 | A | | 10/1991 | Tholkes |
| 5,108,202 | A | | 4/1992 | Smith |
| 5,172,925 | A | | 12/1992 | Kendrick et al. |
| 5,230,113 | A | | 7/1993 | Foster et al. |
| 5,242,180 | A | | 9/1993 | Bergeron |
| 5,265,689 | A | | 11/1993 | Kauffmann |
| 5,294,027 | A | | 3/1994 | Plastina |
| 5,316,370 | A | * | 5/1994 | Newman ........................ 297/313 |
| 5,340,139 | A | | 8/1994 | Davis |
| 5,484,151 | A | | 1/1996 | Tholkes |
| 5,489,258 | A | | 2/1996 | Wohnsen et al. |
| 5,582,464 | A | | 12/1996 | Maymon |
| 5,586,961 | A | | 12/1996 | Quint |
| 5,611,758 | A | | 3/1997 | Rodgers |
| 5,709,633 | A | | 1/1998 | Sokol |
| 5,718,442 | A | | 2/1998 | Alexander et al. |
| 5,772,226 | A | | 6/1998 | Bobichon |
| 5,803,545 | A | | 9/1998 | Guguin |
| 5,829,766 | A | | 11/1998 | Gohlert |
| 5,860,899 | A | | 1/1999 | Rassman |
| 5,884,935 | A | | 3/1999 | Tholkes |
| 5,924,962 | A | | 7/1999 | Rodgers, Jr. |
| 5,961,179 | A | | 10/1999 | Dixon et al. |
| 5,984,338 | A | | 11/1999 | Meyer |
| 5,984,411 | A | * | 11/1999 | Galumbeck .............. 297/344.15 |
| 6,125,957 | A | * | 10/2000 | Kauffmann .................. 180/65.1 |
| D434,198 | S | | 11/2000 | Greaves |
| 6,152,478 | A | | 11/2000 | Hung |
| 6,224,154 | B1 | | 5/2001 | Stoki |
| 6,231,067 | B1 | | 5/2001 | Johnson et al. |
| 6,270,101 | B1 | | 8/2001 | Hase |
| 6,277,056 | B1 | | 8/2001 | McBride et al. |
| 6,368,252 | B1 | | 4/2002 | Stearns |
| 6,368,260 | B1 | | 4/2002 | Crews |
| 6,382,725 | B1 | | 5/2002 | Carroll |
| 6,425,634 | B1 | | 7/2002 | Romero |
| 6,439,657 | B1 | | 8/2002 | Tholkes |
| 6,440,046 | B1 | | 8/2002 | Tholkes |
| 6,527,340 | B1 | | 3/2003 | Finch et al. |
| 6,533,304 | B2 | | 3/2003 | Lizama-Troncoso et al. |
| 6,601,869 | B2 | | 8/2003 | Porcheron |
| 6,619,681 | B2 | | 9/2003 | Gutierrez |
| 6,953,222 | B2 | | 10/2005 | Larrick et al. |
| 7,036,512 | B2 | | 5/2006 | Harnois |
| 7,077,792 | B2 | | 7/2006 | Nerenberg |
| 7,540,565 | B2 | * | 6/2009 | Lipford ......................... 297/325 |
| 7,614,639 | B2 | * | 11/2009 | Tholkes et al. ............... 280/638 |
| 2002/0149168 | A1 | | 10/2002 | Brown |
| 2002/0167205 | A1 | | 11/2002 | Tholkes et al. |
| 2006/0097557 | A1 | * | 5/2006 | Tholkes et al. ............... 297/330 |
| 2010/0007180 | A1 | | 1/2010 | Ovre et al. |
| 2010/0013276 | A1 | | 1/2010 | Tholkes et al. |

FOREIGN PATENT DOCUMENTS

| | | |
|---|---|---|
| JP | 2005237516 | 9/2005 |
| WO | WO 9214432 A1 * | 9/1992 |
| WO | 00/28930 | 5/2000 |

OTHER PUBLICATIONS

Amendment from U.S. Appl. No. 11/247,961 dated Mar. 26, 2009.
Office action from U.S. Appl. No. 11/247,961 dated Apr. 23, 2009.
Communication from European Patent Application Serial No. 05292130.1 dated Jan. 16, 2006.
Office action from U.S. Appl. No. 12/169,492 dated Sep. 2, 2010.
Response from U.S. Appl. No. 12/169,492 dated Dec. 1, 2010.
Office action from U.S. Appl. No. 12/169,492 dated Mar. 4, 2011.
Response from U.S. Appl. No. 12/169,492 dated Jul. 5, 2011.
Office action from Canadian Application No. 2,523,067 dated Jul. 21, 2010.
Response from Canadian Application No. 2,523,067 dated Jan. 20, 2011.
Office action from Canadian Application No. 2,523,067 dated Apr. 11, 2011.
International Search Report and Written Opinion from PCT/US99/27298 dated May 23, 2000.
Response from U.S. Appl. No. 11/247,961 dated Jun. 15, 2009.
Notice of Allowance from U.S. Appl. No. 11/247,961 dated Jul. 21, 2009.
International Preliminary Examination Report from PCT/US99/27298 dated Apr. 3, 2001.
European Search Report from Application No. 05292130.1 dated Dec. 19, 2005.
Communication from EP Application No. 05292130.1 dated Nov. 23, 2006.
Response from EP Application No. 05292130.1 dated Jun. 4, 2007.
Communication from EP Application No. 05292130.1 dated Apr. 24, 2008.
Communication from EP Application No. 05292130.1 dated Aug. 26, 2008.
Response from EP Application No. 05292130.1 dated Oct. 15, 2008.
Communication from EP Application No. 05292130.1 dated Dec. 17, 2009.
Response from EP Application No. 05292130.1 dated Jun. 17, 2010.
Altimate Medical, EasyStand, 7000 Series Magician brochure, copyright 1998, 4 pgs.
Altimate Medical, EasyStand Family of Standing Products, 3 pgs., copyright 1998.
EasyStand 5000 Owner's Manual brochure, 11 pgs., copyright May 1996.
EasyStand, 5000 Series brochure, 8 pgs., copyright 1998, Altimate Medical.
Standing Update, Altimate Medical, 4 page brochure, Spring 1998, vol. 2, No. 1.
Your Alternative for Mobility, The Rifton Mobile Stander, two page brochure, date unknown.
Stand Aid of Iowa, Standing Frames, 3 page web printout dated Oct. 12, 2007 from http://www.stand-aid-com/standing_frames_power_standing_frames.htm.
Prime Engineering, The Art of Standing, 2 page web printout dated Oct. 12, 2007 fom http://www.primeengineering.com/index.php?n=38&id=43.
AltimateMedical, EasyStand Evolv, Owner's Manual, 2007.
EasyStand Evolv, pp. 8-13 from easystand.com, copyright 2007, Altimate Medical.
European Search Report from Application No. 04292130 dated Dec. 19, 2005.
"Symmetry—The First Shear Reducing Solid Seat Standing System", http://www.primeengineering.com, Prime Engineering, 2004.
"Standing TranStander, 71," http://www.rifton.com/r/Standing/SupineStanders,Rifton Equipment, Community Products, LLC, 2004.

* cited by examiner

SEAT

RELATED APPLICATIONS

The present application claims the benefit of U.S. provisional application Ser. No. 61/022,588, filed on Jan. 22, 2008, titled "Seat." U.S. provisional application Ser. No. 61/022,588 is incorporated herein by reference in its entirety.

BACKGROUND

Standing Frames are devices adapted to support an individual in a weight bearing position. Typically, these devices include a seat that articulates to lift from a seated posture and support the user in a standing posture. The benefits of standing for a person not able to do so on their own are manifold. Even where there is little or no control over the muscle groups that normally support a person in a standing posture, the standing posture itself improves blood flow, increases bone density, improves flexibility and range of motion, and can improve the user's sense of well being by simply allowing the user to stand.

SUMMARY

The present application discloses exemplary embodiments of seats that can be used in a variety of different applications, including standing frames. The disclosed seats are moveable from a seating orientation, which allows a user to sit on the seat, to a standing orientation, where the seat at least partially supports the user in a standing posture. At least a portion of the seat is moveable away from the user's legs when the seat is in the standing orientation.

DETAILED DESCRIPTION OF EXEMPLARY EMBODIMENTS

Figure 1A:
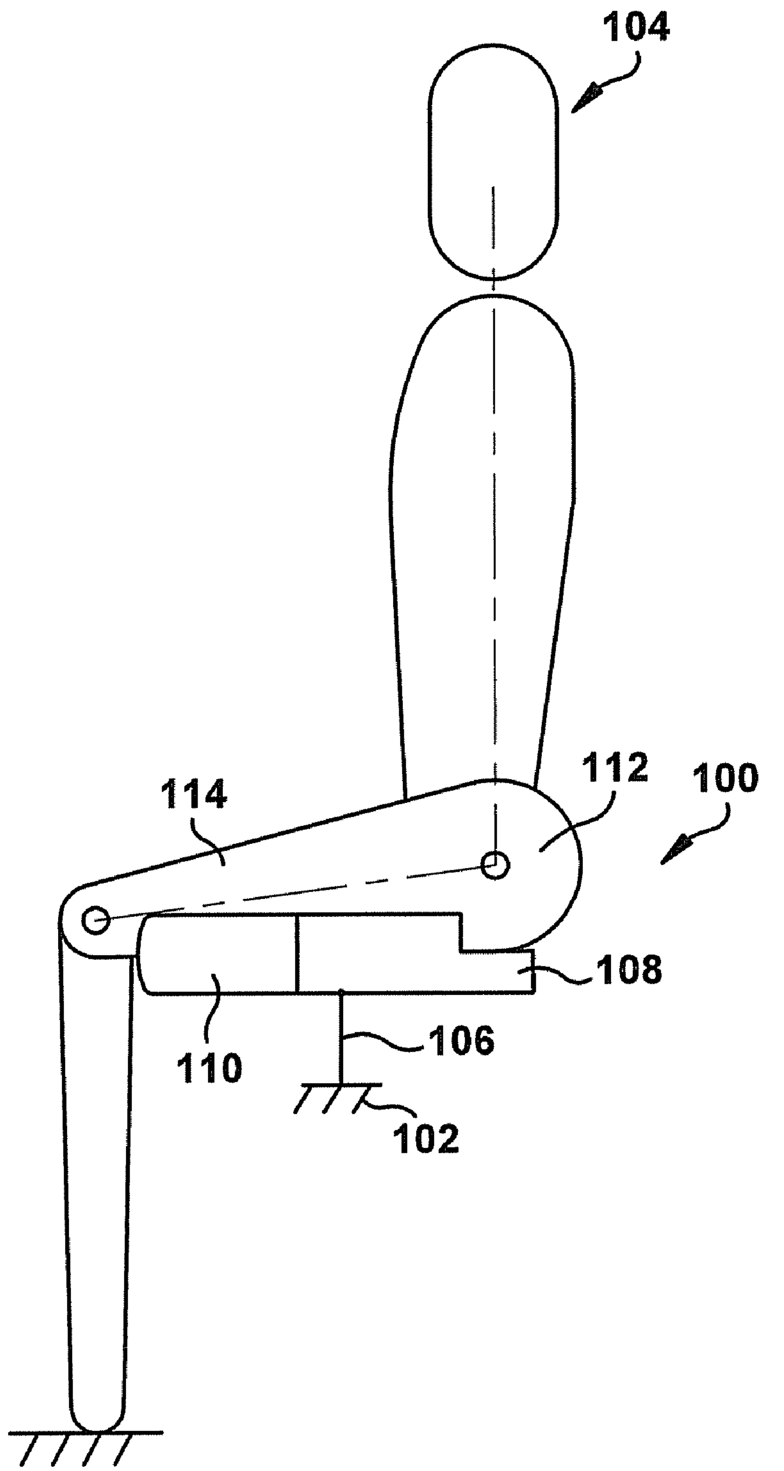
FIG. 1A is a schematic illustration of an exemplary embodiment of a seat in a seating orientation with a user seated on the seat.
Figure 1B:
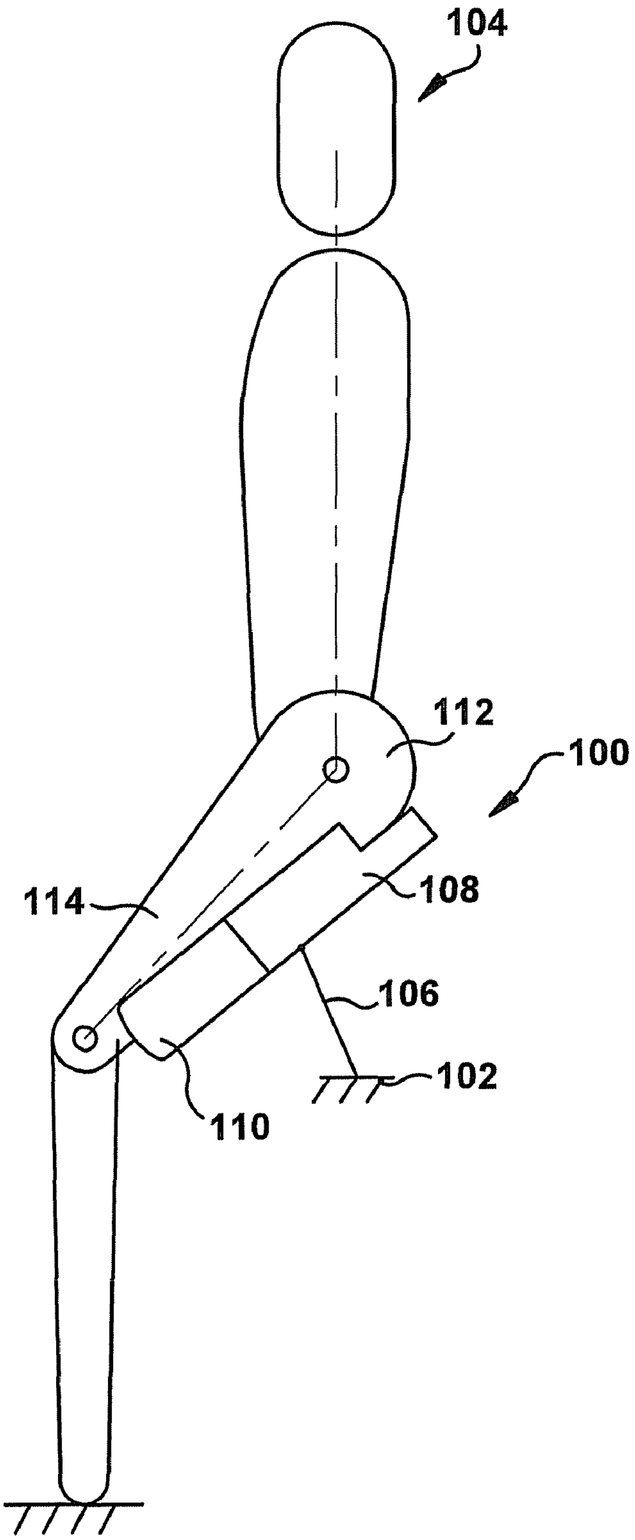
FIG. 1B illustrates the seat of FIG. 1A moved to an intermediate orientation with the user being urged toward a standing posture by the seat.
Figure 1C:
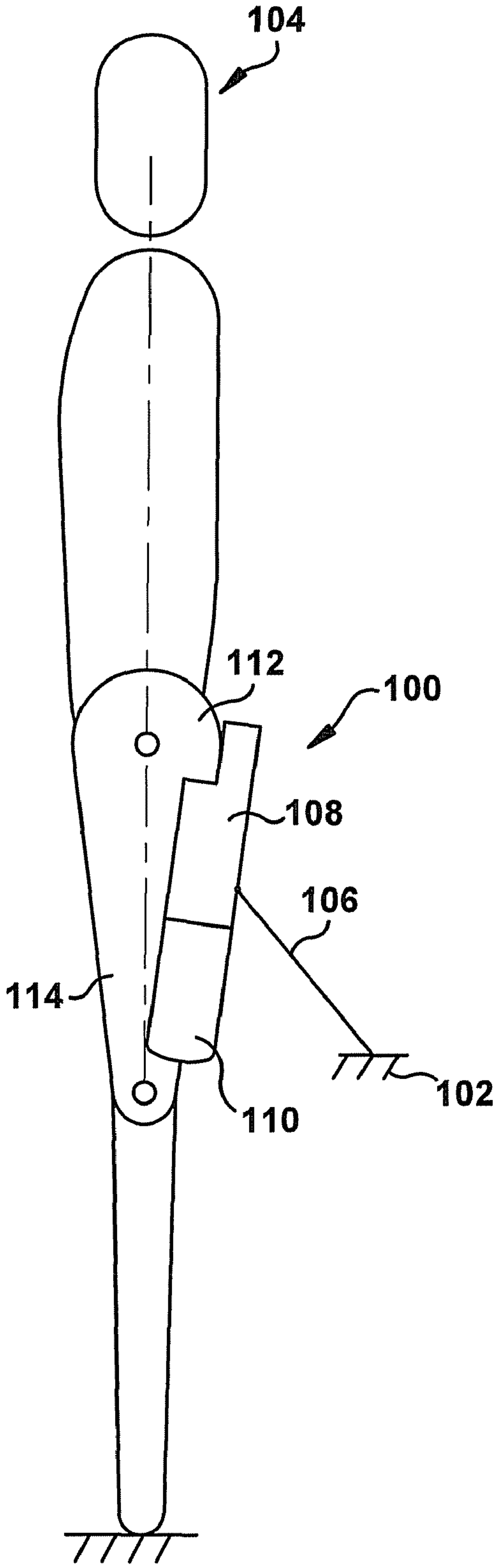
FIG. 1C illustrates the seat of FIG. 1A moved to an standing orientation with the user supported in the standing posture by the seat.
Figure 5A:
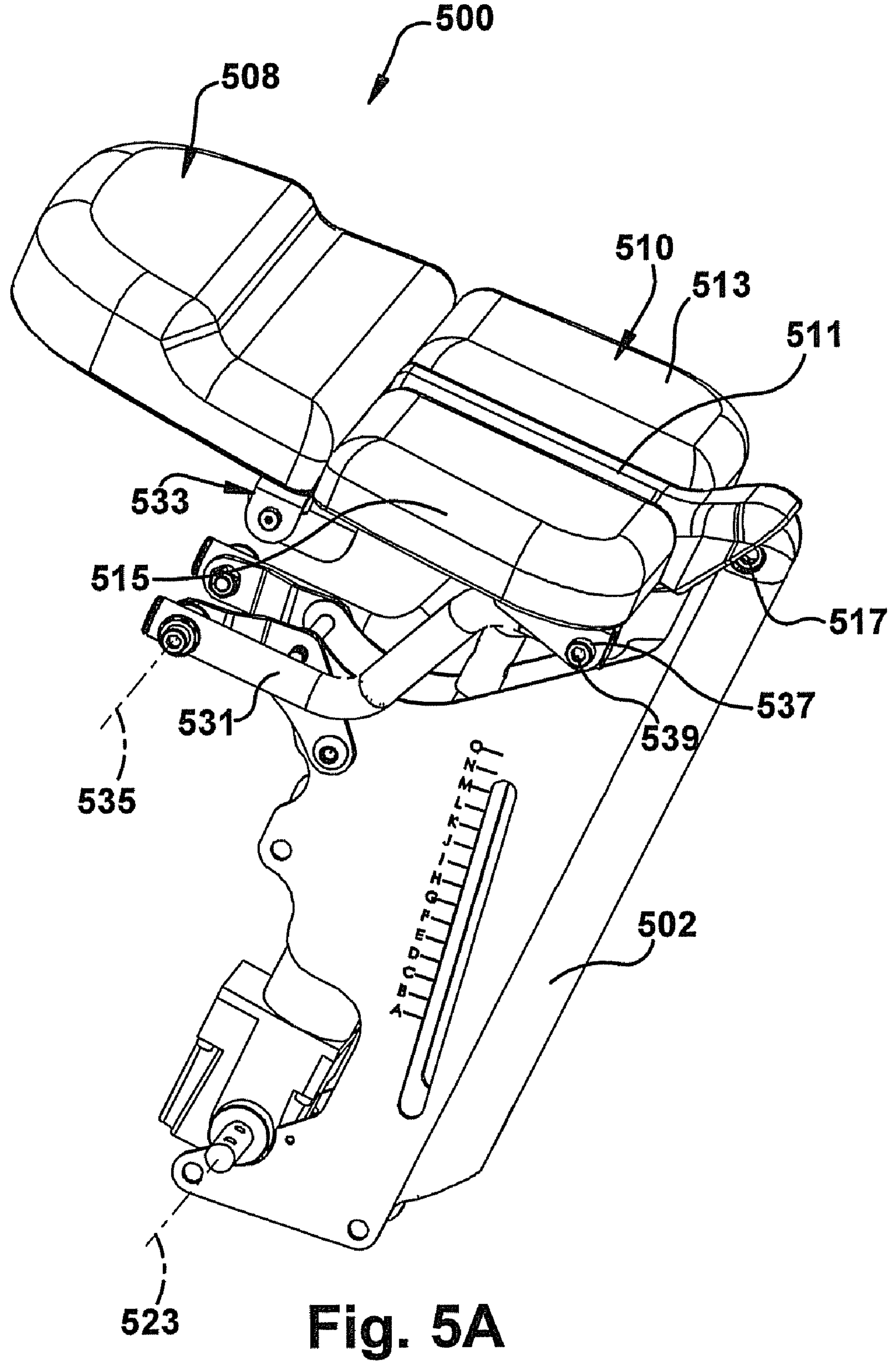
FIG. 5A is a perspective view of an exemplary embodiment of a seat that includes a linkage that moves a portion of the seat away from leg(s) of a user as the seat is moved from a seated orientation to a standing orientation.
Figure 10A:
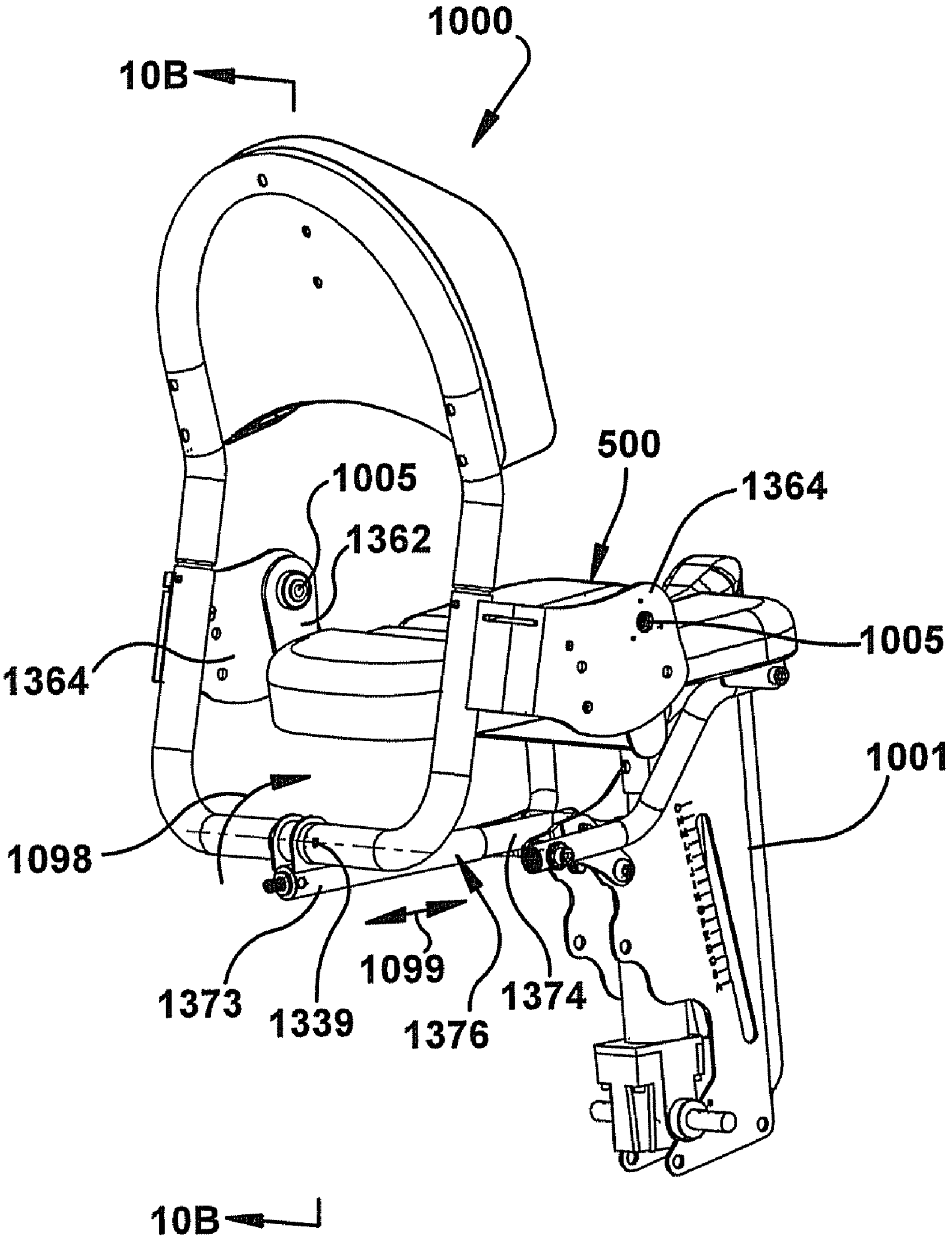
FIG. 10A is a perspective view of an exemplary embodiment of a seat and seat back assembly that includes a linkage that moves a portion of the seat away from leg(s) of a user as the seat is moved from a seated orientation to a standing orientation.

The present application discloses seats 100 (FIG. 1A), 500 (FIG. 5A), 1000 (FIG. 10A) that are moveable from a seating orientation, which allows a user to sit on the seat, to a standing orientation, where the seat at least partially supports the user in a standing posture. At least a portion of the seat is moveable away from the user's legs when the seat is in the standing orientation. The seats 100, 500, 1000 include various inventive aspects, such as various alternatives of seats with one or more portions that are spaced apart from a user's leg(s) when the seat is in a standing orientation. The disclosed inventive aspects of the seats may be used in any application where a seating surface is present. For example, features of the seats used herein can be used in seat lifts, wheelchairs, personal mobility aids, and standing frames. One example of a standing frame is disclosed in United States Patent Application Pub. No.: US 2006/0097557, which is incorporated herein by reference in its entirety.

FIGS. 1A-1D illustrate an exemplary embodiment of a seat 100 coupled to a frame 102 such that the seat is moveable between a seating orientation (FIG. 1A) that allows a user 104 to sit on the seat to a standing orientation (FIG. 1C) where the seat at least partially supports the user in a standing posture. The seat 100 may be moved between the seating orientation and the standing orientation in a wide variety of different ways. The movement between the seating orientation and the standing orientation may be manual or automatic. Mechanisms for moving the seat 100 between the seating orientation and the standing orientation include, but are not limited to, motors, linear actuators, ratchet mechanisms, lever mechanisms, linkages and the like. Any mechanism capable of moving the seat between the seating orientation and the standing orientation may be used. Reference character 106 generically represents a mechanism for moving the seat 100 between the seating orientation and the standing orientation.

The seat 100 illustrated by FIGS. 1A-1D includes a rearward support portion 108 and a forward support portion 110. In the example illustrated by FIG. 1A, the rearward support portion 108 is configured to engage the user's buttocks 112 when the seat is in the seating orientation and the forward support portion 110 is configured to engage the user's legs 114, such as the user's thighs or other portion of the user's legs when the seat is in the seating orientation. The size and shape of the rearward support portion 108 and the forward support portion 110 may be selected to accommodate any user.

Figure 1D:
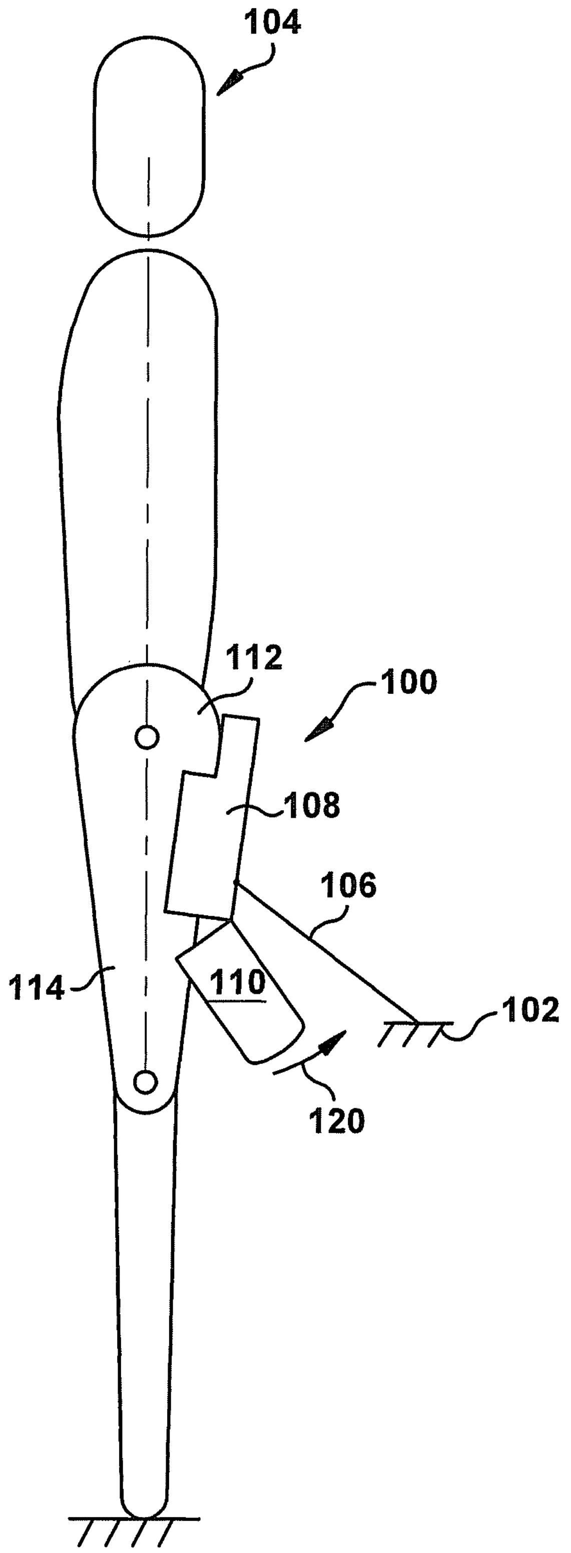
FIG. 1D illustrates the seat of FIG. 1D with a portion of the seat moved away from leg(s) of the user.

Referring to FIG. 1D, in the exemplary embodiment the forward support portion 110 is configured to at least partially move away, as indicated by arrow 120 in FIG. 1D, from the user's legs 114 when the seat 100 is in the standing orientation. The forward support portion 110 may move away from the user's legs 114 in a wide variety of different ways. For example, the forward support portion may be manually moved away from the user's legs 114 once the seat is in the standing orientation, the forward support portion may automatically move away from the user's legs once the seat has been moved to the standing orientation, the forward support portion may be moved away from the user's legs by a powered actuator once the seat has been moved to the standing orientation, or the forward support portion may automatically move away from the user's legs as the seat is moved from the seating orientation to the standing orientation. In the exemplary embodiment, the forward support portion 110 is returned to its original position with respect to the rearward support portion 108 before or as the seat 100 is returned to the seating orientation.

The rearward support portion 108 and the forward support portion 110 may be coupled to one another in a wide variety of different ways. Examples of ways the rearward support portion 108 and the forward support portion 110 may be coupled include, but are not limited to, hinged connections, connection by resilient members, being integrally formed of a resilient material, and the like. Any coupling of the forward support portion 110 to the rearward support portion 108 that allows the forward support portion to move away from the user's legs can be used.

Figure 1E:
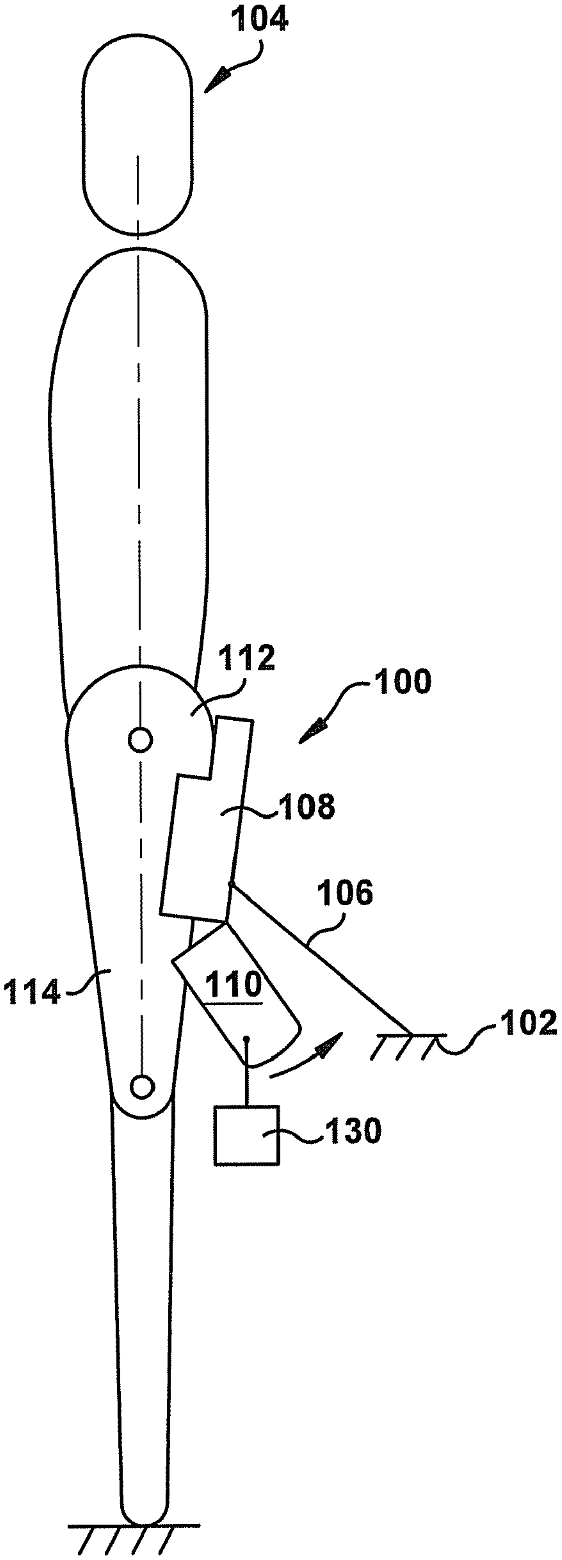
FIG. 1E illustrates an embodiment of the seat that is similar to the embodiment illustrated by FIG. 1D where the portion of the seat is automatically moved away from leg(s) of the user.

FIG. 1E illustrates a seat 100 that includes an optional mechanism 130 for moving the forward support portion 110 with respect to the rearward support portion between the seating orientation and the standing orientation. Examples of mechanisms that may be used include, but are not limited to, motors, linear actuators, ratchet mechanisms, lever mechanisms, linkages and the like. Any mechanism capable of moving the forward support portion 110 away from the user's legs 114 may be used.

The support portion 110 may be moved away from the user's legs for a wide variety of different reasons. For example, the support portion 110 may be moved away from the user's legs to reduce rubbing against or contact with the user's legs. Reducing the contact area between the user's leg(s) and the seat when the seat is in the standing orientation increases the range of motion of the user's leg(s).

FIGS. 2A-2D illustrate an exemplary embodiment of a seat assembly 200 coupled to a frame 202 such that the seat assembly is moveable between a seating orientation (FIG. 2A) that allows a user 104 to sit on the seat assembly to a standing orientation (FIG. 2C) where the seat assembly at least partially supports the user in a standing position. The seat assembly 200 comprises the seat 100 and a seat back 202.

The seat 100 is described with reference to FIGS. 1A-1E and therefore is not described again in detail.

Figure 2A:
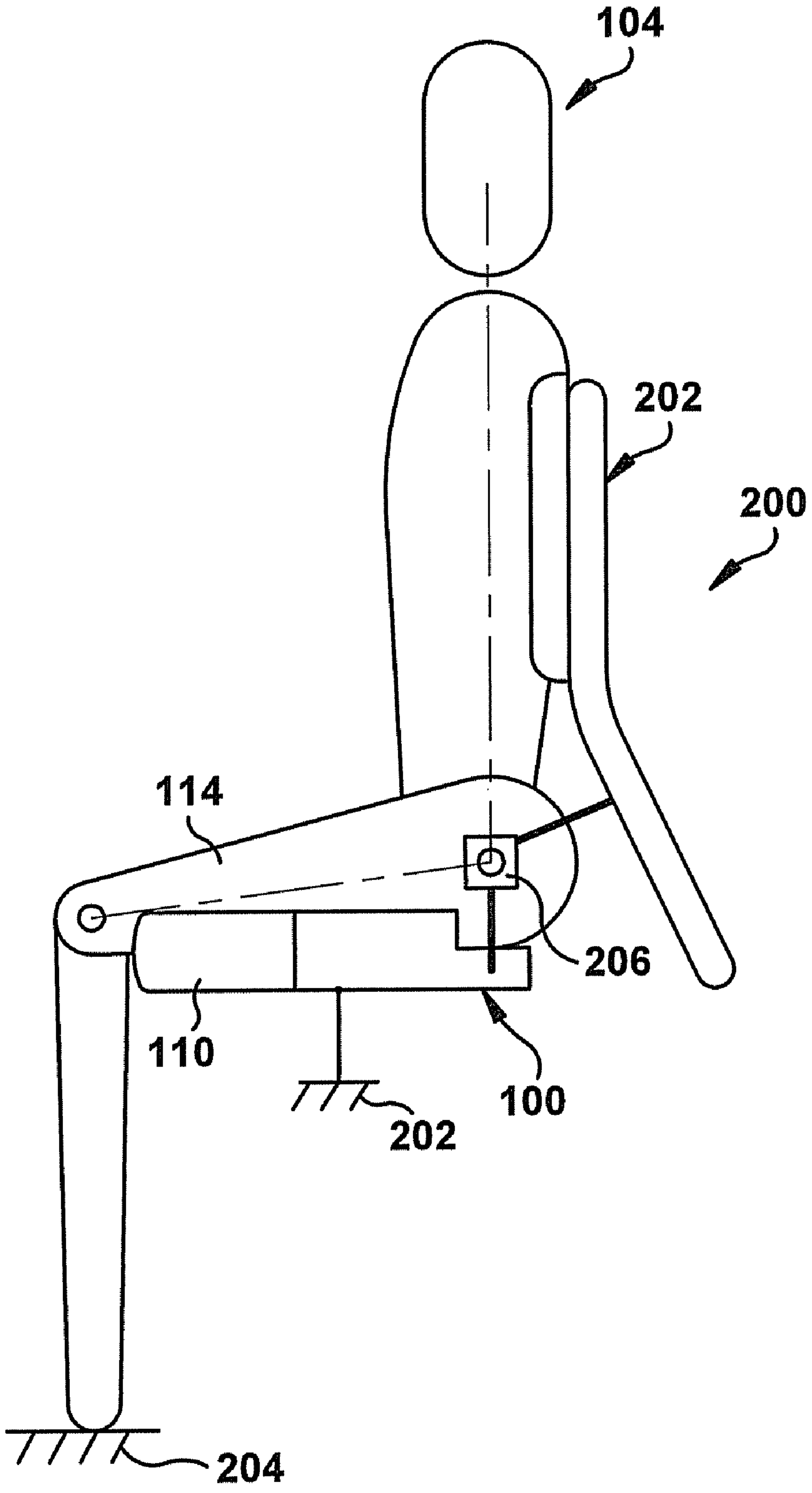
FIG. 2A is a schematic illustration of an exemplary embodiment of a seat with a seat back in a seating orientation with a user seated on the seat.
Figure 2B:
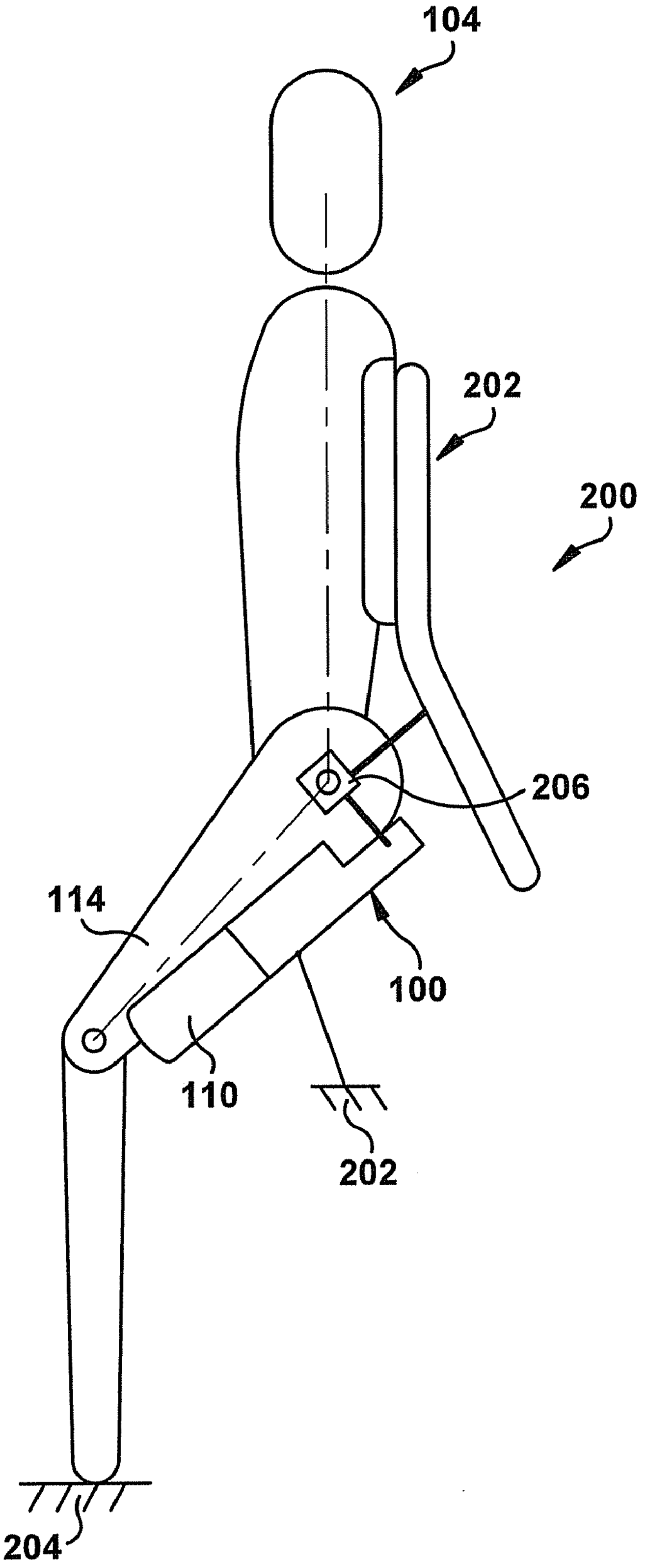
FIG. 2B illustrates the seat of FIG. 2A moved to an intermediate orientation with the user being urged toward a standing posture by the seat.
Figure 2C:
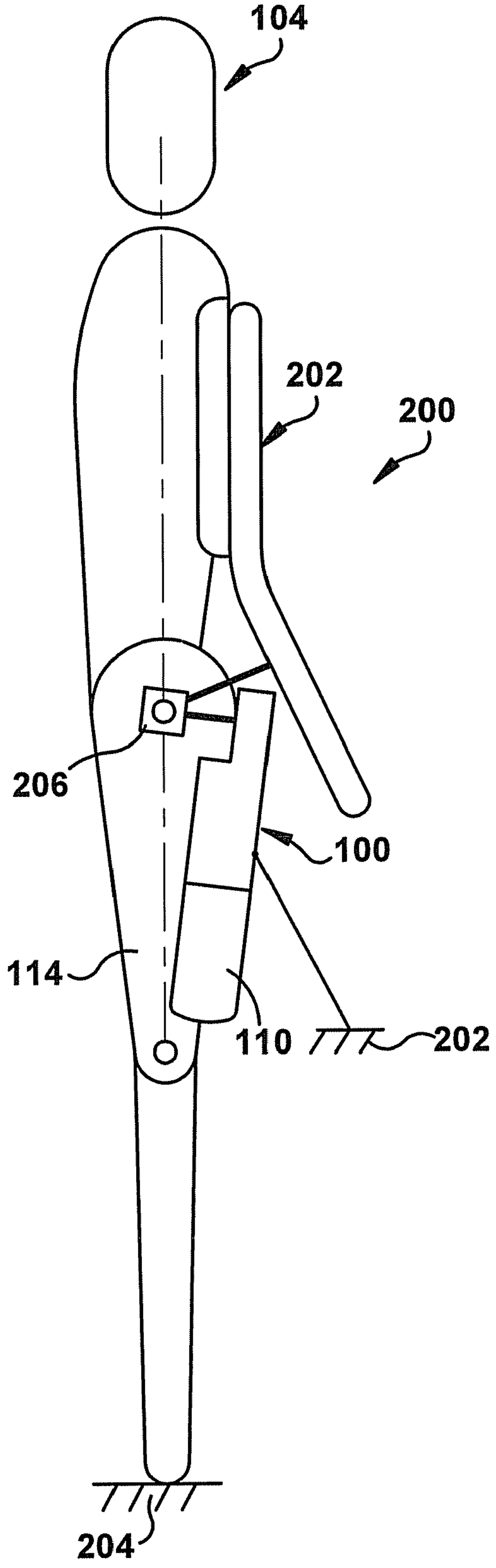
FIG. 2C illustrates the seat of FIG. 2A moved to a standing orientation with the user supported in the standing posture by the seat.

The seat back 202 is coupled to the seat 100. The seat back 202 may be coupled to the seat 100 in a wide variety of different ways. In the example illustrated by FIGS. 2A-2D, the seat back 202 is coupled to the seat 100 such that the orientation of the seat back 202 with respect to a support surface 204, such as a floor, is maintained as the seat is moved between the seating orientation (FIG. 2A) and the standing orientation (FIG. 2C). In the example illustrated by FIGS. 2A-2D, the seat back 202 is maintained in an orientation that positions the user's back in a substantially upright position. However, any orientation may be selected based on the user's need and comfort. A variety of different mechanisms 206 may be used to maintain the orientation of the seat back 202 with respect to a support surface 204. Examples include, but are not limited to, mechanical arrangements, such as linkages and gear trains, and motor(s) coupled to the seat back that are controlled based on input from position sensors. In other embodiments, the seat 100 is coupled to the seat back 202, such that the orientation of the seat back with respect to the support surface 204 changes as the seat is moved from the seating orientation to the standing orientation.

Figure 2D:
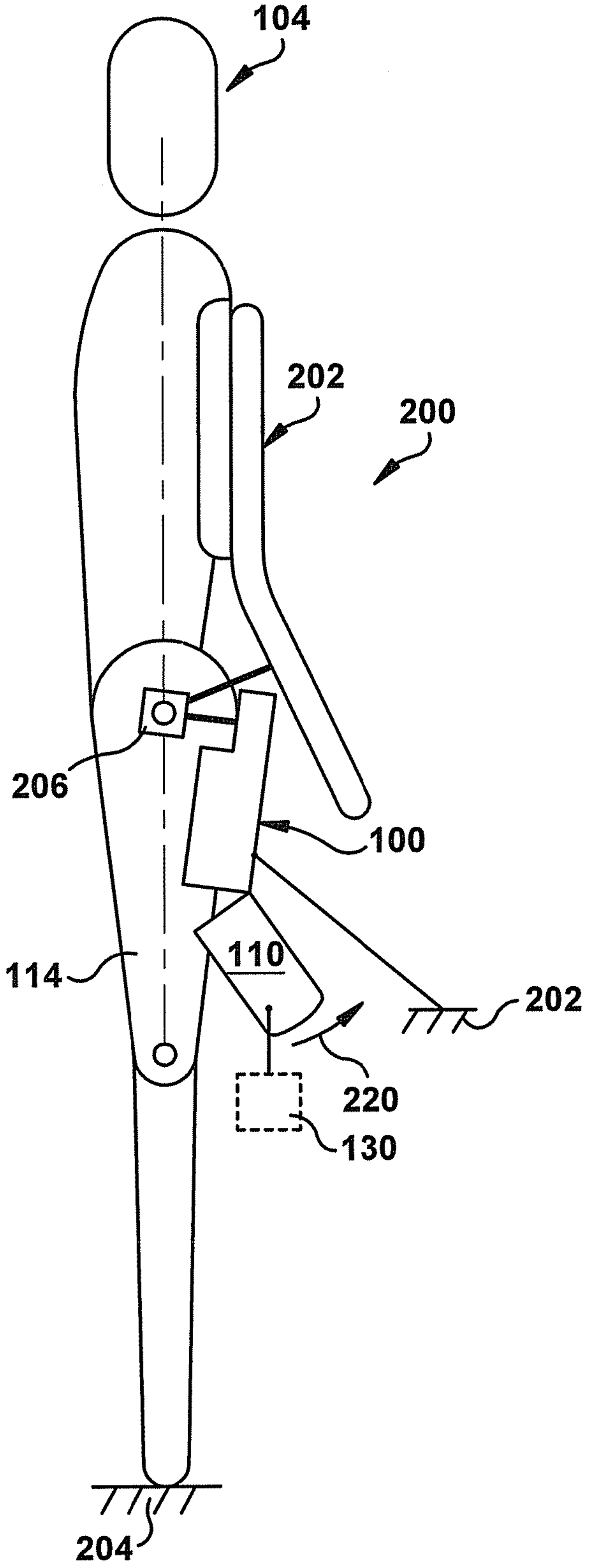
FIG. 2D illustrates the seat of FIG. 2A with a portion of the seat moved away from leg(s) of the user.

Referring to FIG. 2D, in the exemplary embodiment the forward support portion 110 is configured to at least partially move away, as indicated by arrow 220, from the user's legs 114 when the seat 100 is in the standing orientation. FIG. 2D illustrates that the seat assembly 200 may include the optional mechanism 130 for moving the forward portion 110 with respect to the rearward support portion between the seating orientation and the standing orientation.

The seat 100 and seat assembly 200 may be used in a wide variety of different applications. Applications for the seat and seat assembly include, but are not limited to, standing frames, stationary and wheel chairs, beds, personal mobility vehicles, and the like. United States Patent Application Pub. No.: US 2006/0097557 (hereinafter "the '557 application") discloses an example of one of the many different applications the seat 100 and seat assembly 200 described herein can be used in. The '557 application discloses a standing frame. The seat assembly 200 can replace the chair module described in the '557 application. It is emphasized that the seat assembly may also be used in any other standing frame and in other applications. United States Patent Application Pub. No.: US 2006/0097557 is incorporated herein by reference in its entirety.

Figure 3:
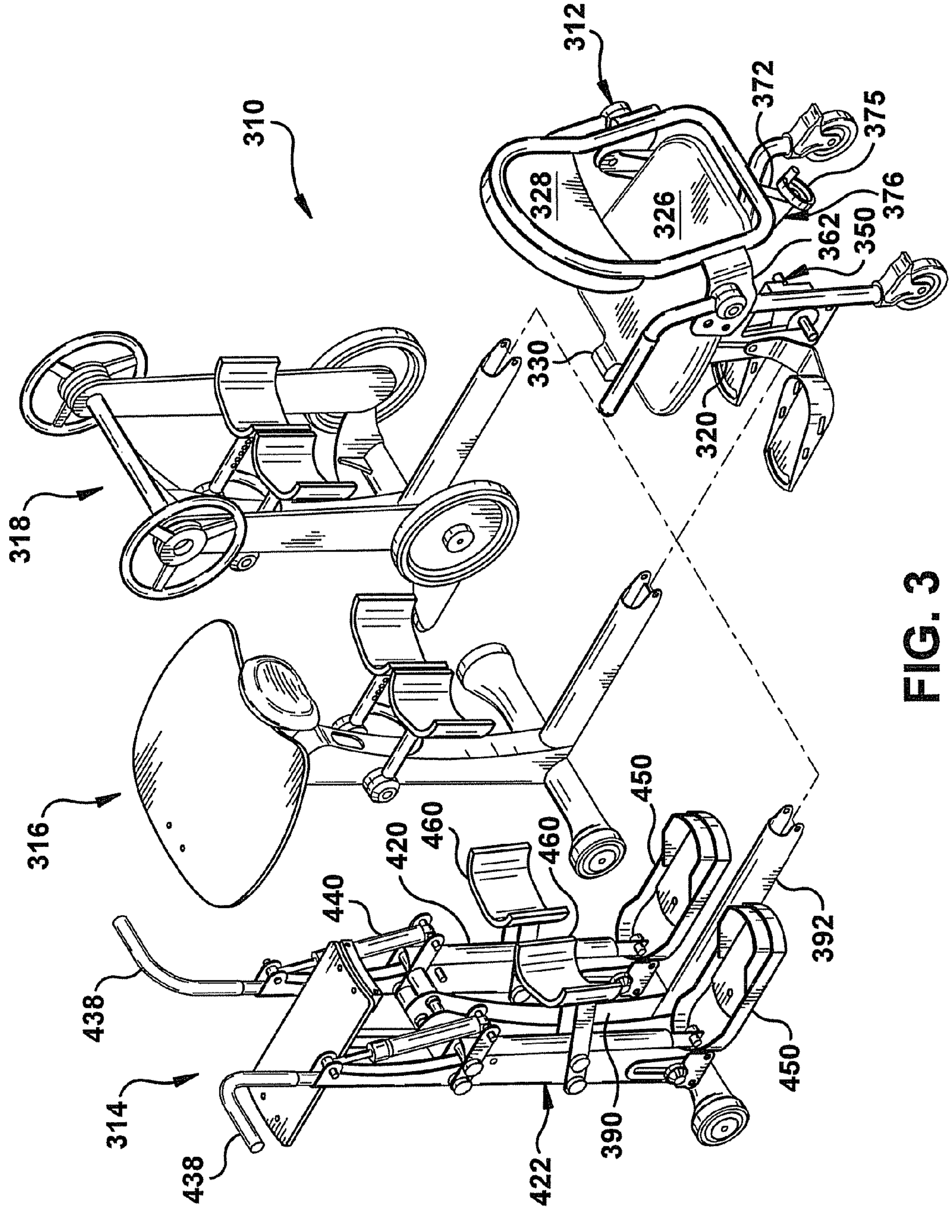
FIG. 3 is an exploded view of an embodiment of a modular standing frame that may include a seat with a portion that moves away from a user's leg(s)

FIGS. 3, 3A and 4A-4E are taken from United States Patent Application Pub. No.: US 2006/0097557 (with reference characters changed to correspond to the reference characters of this description) and illustrate an example of a modular standing frame 310. A modular standing frame is a standing frame with various different modules that can be assembled together to allow the standing frame to be configured for different uses. FIG. 3 is an exploded view of various modules of one embodiment of the modular standing frame 310. The standing frame 310 includes a chair module 312, a glider module 314, a workstation module 316, and a mobility module 318. In use, the chair module 312 is coupled to one of the glider module 314, workstation module 316, or mobility module 318.

The chair module 312 has a seat 326 and a seat back 328 that are constructed and arranged on an articulated framework to raise and lower a user of the standing frame 310 between a lower, seated posture and a raised, standing posture. The chair module 312 may also be used to support a user in postures that fall between the seated and standing postures.

Figure 4A:
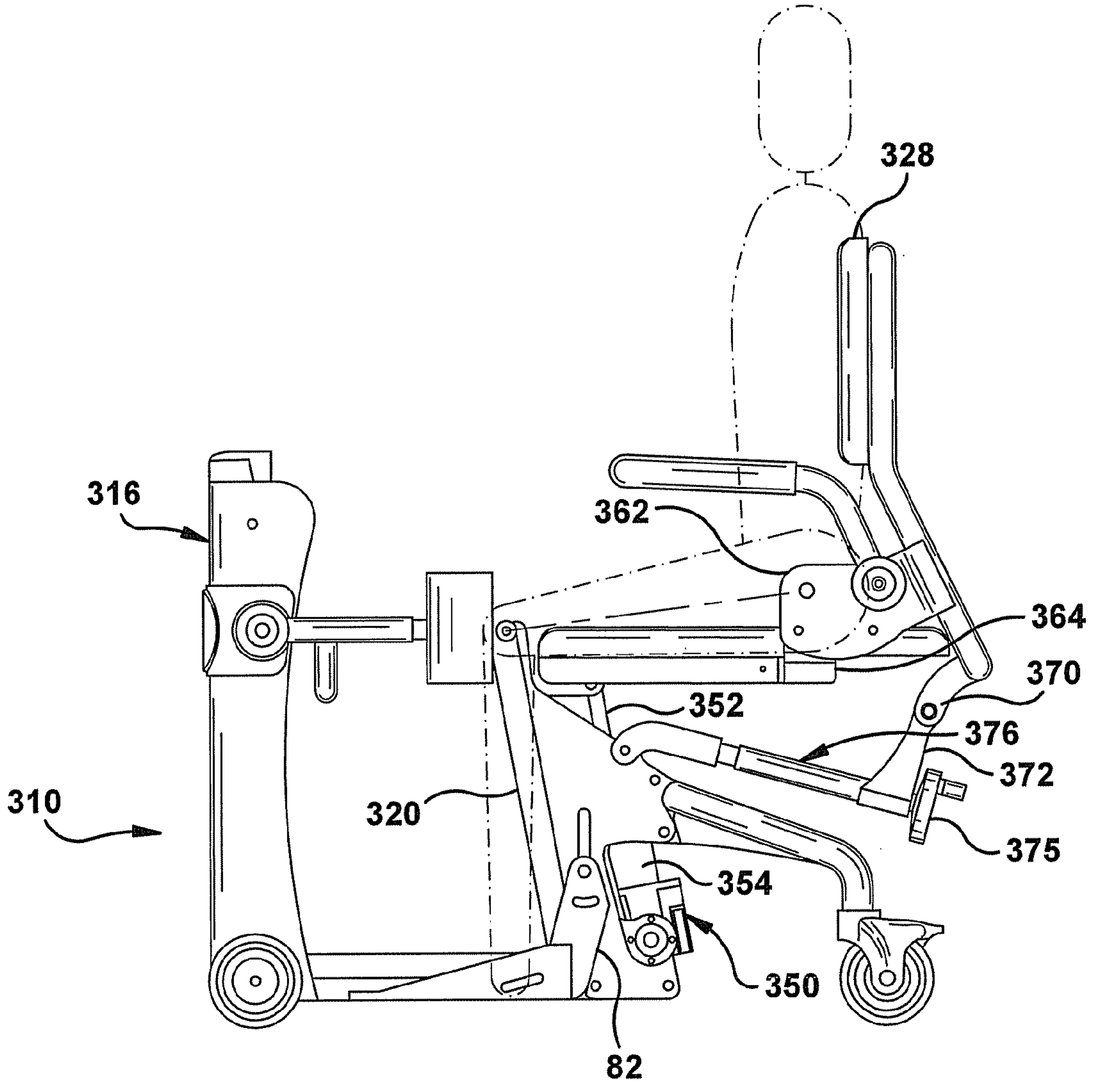
FIG. 4A is a side elevation of an embodiment of a standing frame in a seated orientation that may include a seat with a portion that moves away from a user's leg(s)

Referring to FIGS. 3, and 4A, the chair module 312 is built around a support member 320. Referring to FIGS. 3, 4D and 4E, a hinge 330 couples the seat 326 to the upper end of the support member. The lower end of the support member 320 is adapted to couple the chair module 312 to one of the remaining modules to form a complete standing frame 310. The hinge 330 is fixed to the seat 326 such that the seat will rotate with the hinge 320.

A linear actuator 350 is coupled between a lower portion of the support member 320 and the seat 326. The linear actuator 350 is in the illustrated embodiment a hydraulic cylinder having a shaft 352 that reciprocates within a piston body 354. The actuation of the linear actuator 350 extends the shaft 352 to raise the seat 326. Similarly, actuation of the linear actuator 350 to retract the shaft 352 acts to lower the seat 326. The linear actuator 350 may be any reciprocal mechanism able to raise and lower the seat 326 with a user seated thereon through the desired range of motion. Furthermore, the linear actuator 350 may be manually actuable or may include some means of motive power such as an electric or hydraulic motor. By way of example only, the linear actuator 350 may be a screw driven device, a hydraulic cylinder, a pneumatic cylinder, or a mechanical linkage.

Referring to FIG. 4D, hip plates 362 are fixed to the opposing sides of the seat back 328. The hip plates 362 are in turn rotatively pinned to hip plates 364 that are affixed to the opposing sides of the seat 326. In this manner, the seat back 328 is coupled to the seat 326 and yet is free to rotate with respect thereto. In one embodiment, the respective hip plates 364 are adjustable fore and aft on the seat 326. The adjustment of the position of the hip plates 364 allows the seat back 328 to be moved forward or backward to accommodate for variations in the length of a users' legs.

An upper connector arm 370 is affixed to and depends from a lower portion of the seat back 328. The upper connector arm 370 is rotatively pinned to a lower connector arm 372 that is secured at its opposing end to a free end of an adjustment member 376. The adjustment member 376 is, in turn, rotatively pinned to the support member 320 by yoke 378. The adjustment member 376 is adapted such that the distance between the point at which the upper and lower connector arms 370, 372 are joined and the point at which the yoke 378 is coupled to the support member 320 may be modified. In the illustrated embodiment, a hand wheel 375 modifies the length of the adjustment member 376. In other embodiments, the adjustment member 376 may consist of, among other things, a pneumatic cylinder, a hydraulic cylinder, or an electrically operated screw mechanism.

The seat 326, seat back 328, adjustment mechanism 376, and support member 320 form a four-bar linkage. In an exemplary embodiment, the four bar linkage is configured to substantially maintain the orientation of the seat back 32 with respect to the surface on which the standing frame 310 rests. In this manner, the seat back 326 maintains the users back in the same attitude in both the sitting and standing postures. The angle of the seat back 328 may be adjusted by means of the adjustment mechanism 376. For example, increasing the length of the adjustment mechanism 376 causes the seat back 328 to rotate forward. Conversely, decreasing the length of the adjustment mechanism 376 causes the seat back 328 to rotate backwards.

Figure 4B:
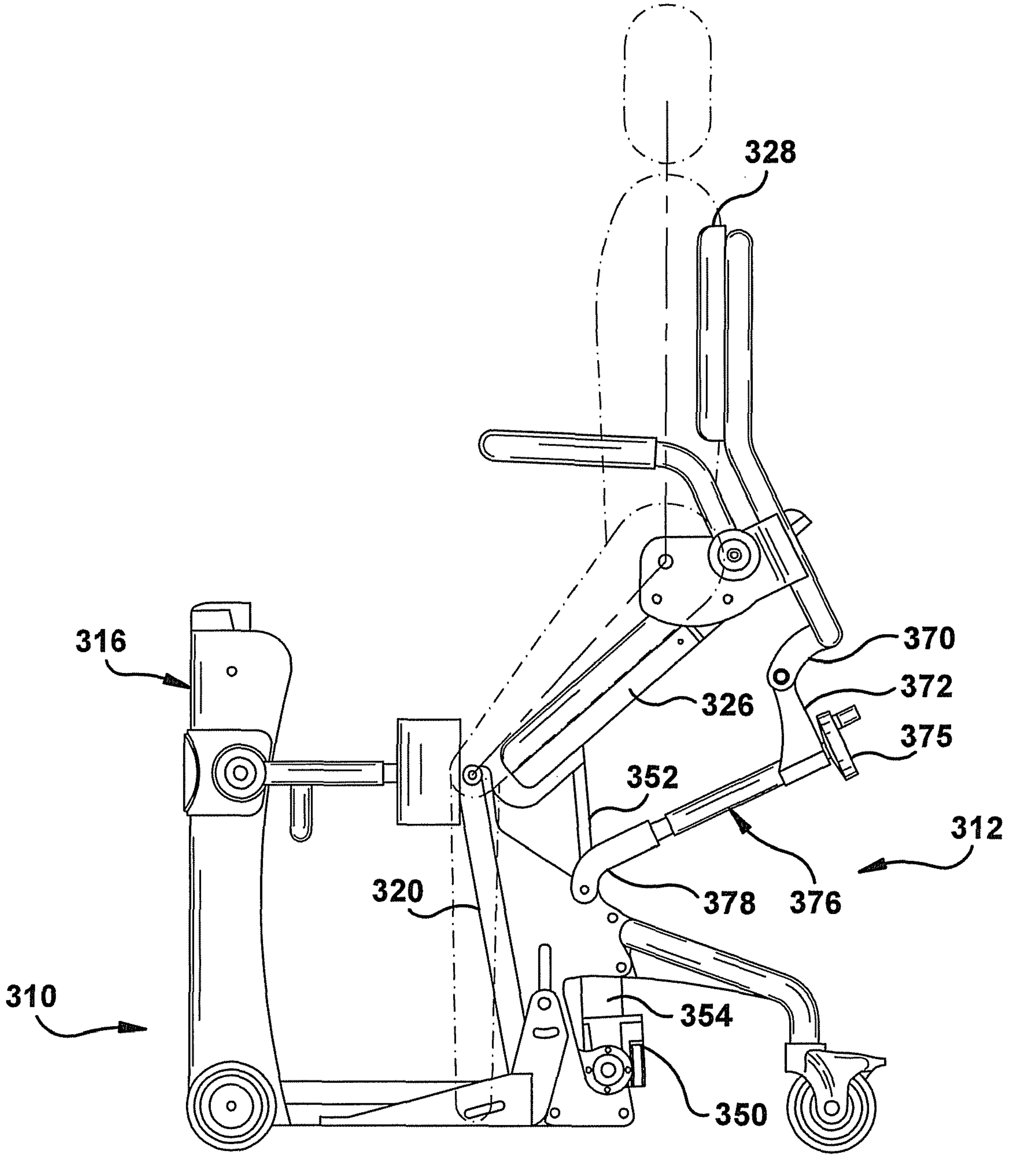
FIG. 4B is a side elevation of the standing frame of FIG. 4A in an intermediate orientation.
Figure 4C:
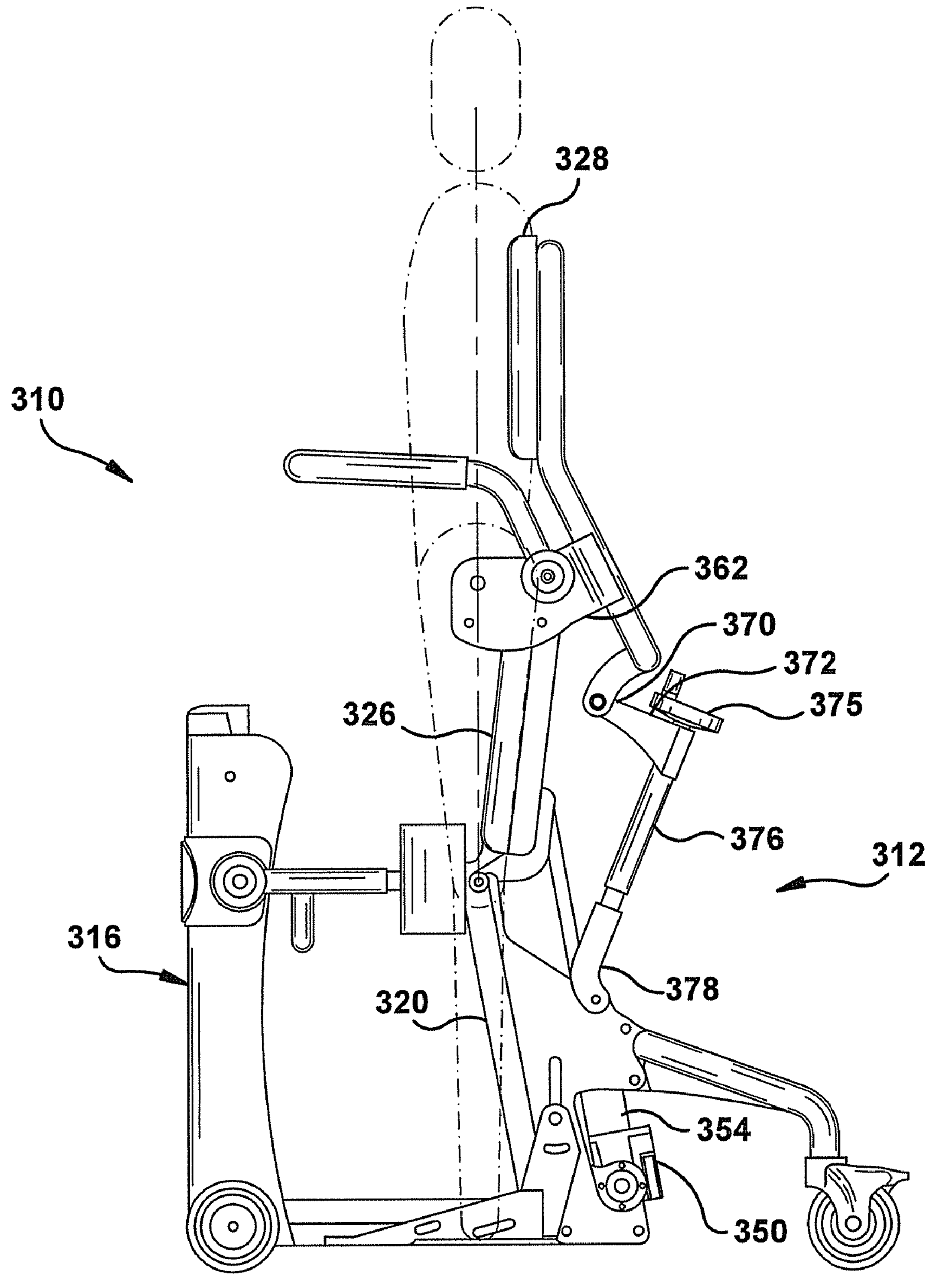
FIG. 4C is a side elevation of the standing frame of FIG. 4A in a standing orientation.
Figure 4D:
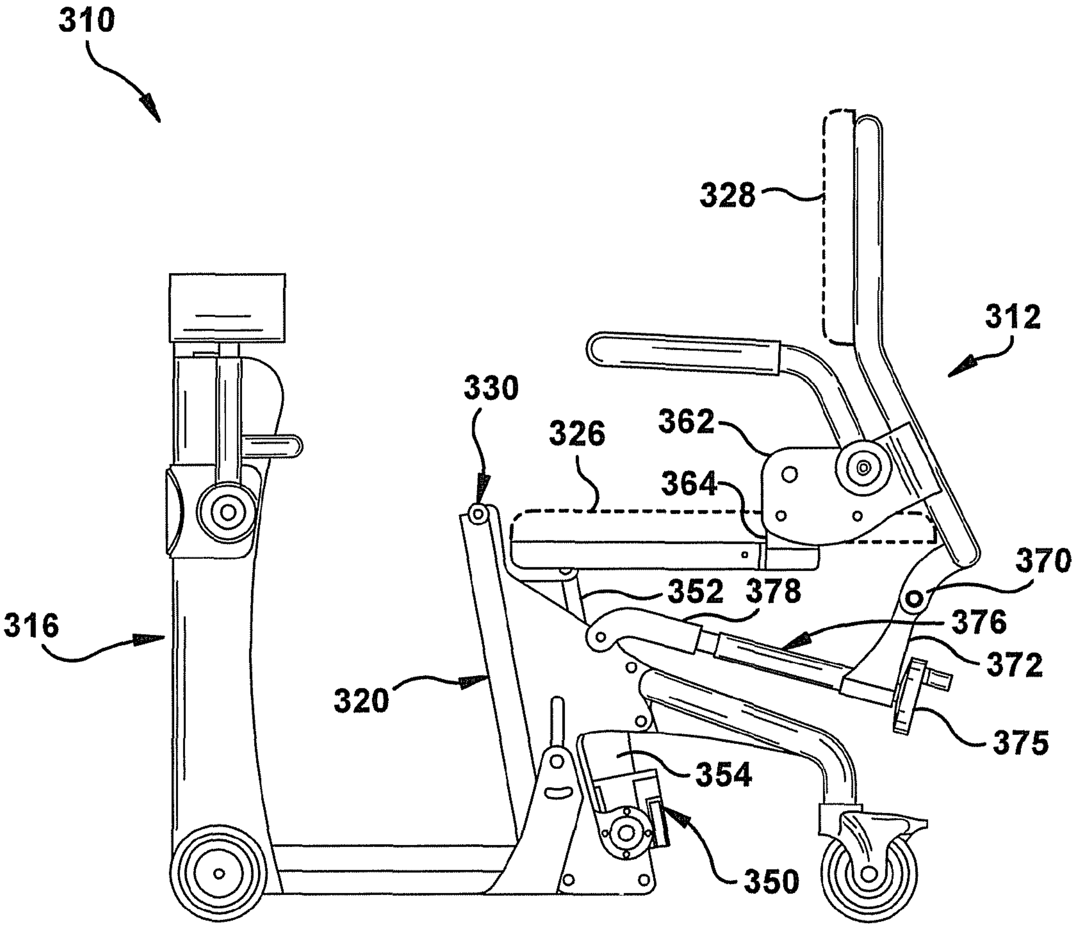
FIG. 4D illustrates the standing frame as shown in FIG. 4A without illustrating the user.
Figure 4E:
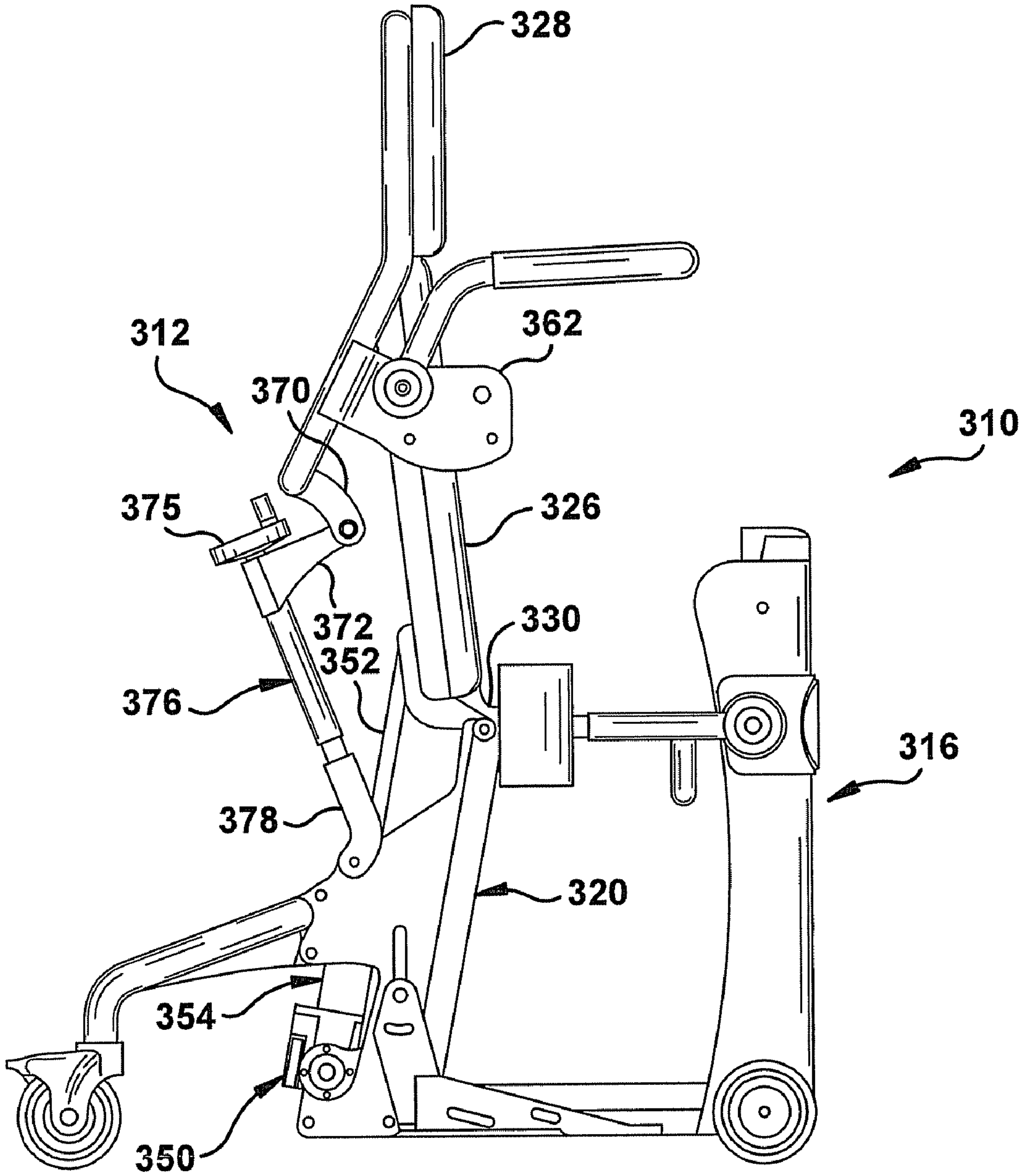
FIG. 4E illustrates the standing frame as shown in FIG. 4C without illustrating the user.

FIGS. 4A, 4B, and 4C illustrate the sitting posture, a transition, and the standing posture of a user in the chair module 312, respectively. Turning first to FIG. 4A, a user (shown in phantom) is seated on the chair module 12. In FIGS. 4A-4C the chair module 312 is coupled to a workstation module 316. The chair module 312 may be actuated to raise the user from a sitting posture to a standing or semi-standing posture. As described above, the user is raised from a sitting posture to a standing or semi-standing posture by activating the linear actuator 350. As the shaft 352 of the linear actuator 350 is extended, the seat 326 is forced upward. As the seat 326 pivots about hinge 330, the user is lifted thereon.

As the seat 326 is rotated upward, as seen in FIG. 4B, the seat back 328 are carried along. However, the movement of the seat back 328 is constrained by the adjustment mechanism 376. Accordingly, the user's upper body is maintained in the same or substantially the same orientation or attitude as the user is raised toward a standing posture in an exemplary embodiment.

As can be seen in FIG. 4C, when the chair module 312 is in its standing posture, the legs of the user are maintained in a fully extended, weight-bearing attitude. The legs and buttocks of the user are supported by the seat 326, the back of the user is supported by the seat back 328.

Figure 3A:
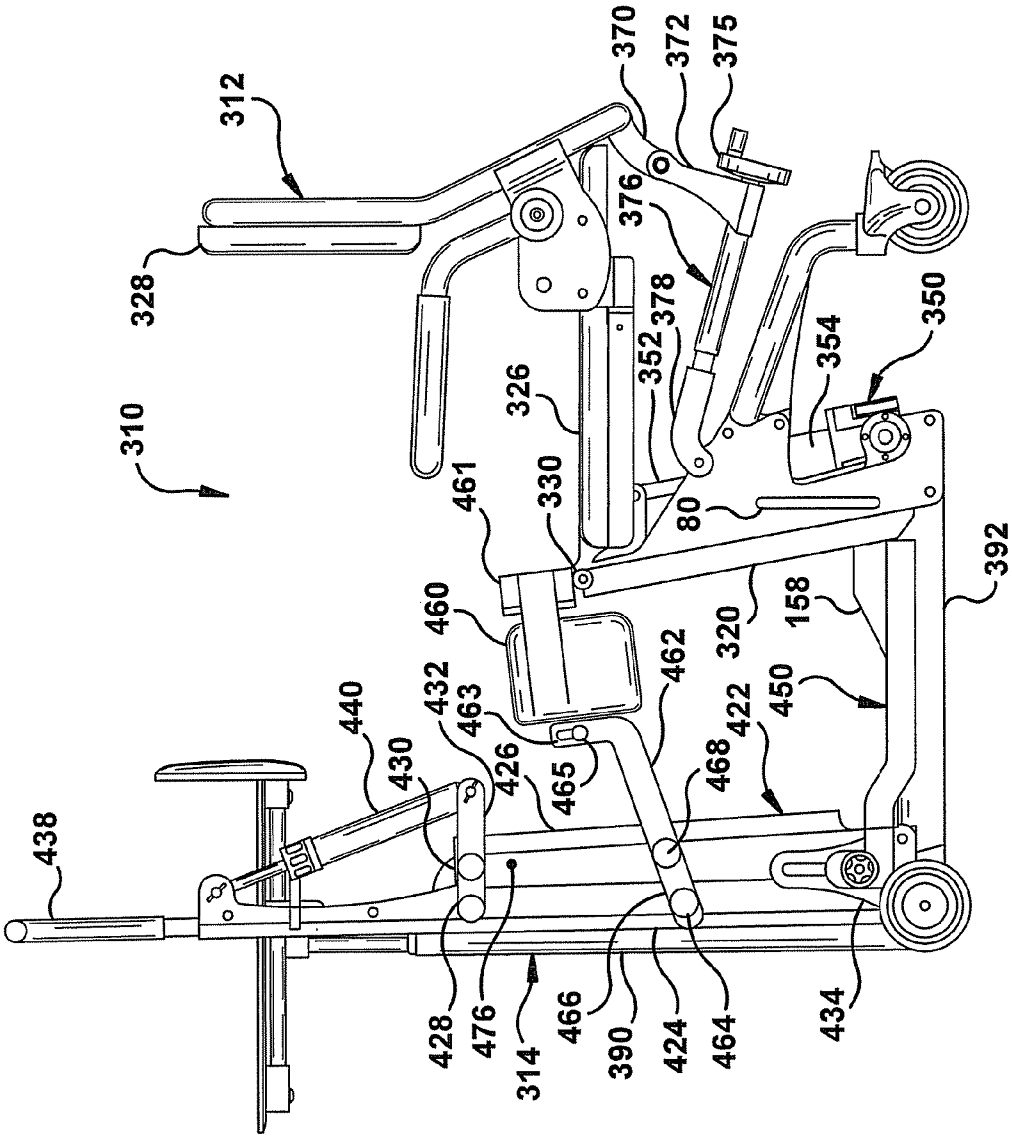
FIG. 3A is a side elevation view of the standing frame of FIG. 3 with a glider module installed.

The seat 100 and seat assembly 200 can be particularly useful in applications where a user exercises her legs while supported in a standing posture. One such application is in an exercising apparatus where the user is supported in a standing posture. An example of such an exercising apparatus is the standing frame 310 with a glider module 314 disclosed by United States Patent Application Pub. No.: US 2006/0097557. The standing frame 310 is configured to combine the chair module 312 with the glider module 314. The glider module 314 is adapted to provide range of motion and exercise therapy for a user of the standing frame 310. The glider module has a column 390 and coupling bar 392 that are coupled to the chair module 312. FIGS. 3 and 3A illustrate the glider module 314.

Referring to FIG. 3, legs 420 and 422 are coupled to the right and left hand sides of column 390, respectively. The legs 420, 422 support the user of the standing frame 310 in a standing, weight bearing posture and allow the legs of the user to move back and forth in a motion that approximates walking. The walking motion enabled by the legs 420, 422 improves muscle tone, strengthens muscles and connective tissues, and improves the elasticity of the user's musculature and connective tissue.

Referring to FIG. 3A, as the legs 420, 422 of the glider module 314 are mirror images of one another, only the left leg 422 will be described in detail. Leg 422 consists of a pair of partially telescoping, interlocking channel members 424, 426. Channel members 424 and 426 are rotatively coupled to a bar 432 and to the column 390 by axles 428 and 430. A bracket 434 is rotatively pinned to the bottom of the channel members 424, 426. Bar 432, bracket 434, and channel members 424, 426 together form a four-bar linkage.

Channel member 424 extends above bar 432 and terminates in a handle 438. A resistive element 440 is coupled between an upper portion of the channel member 424 above the bar 432 and a free end of bar 432. The resistive element 440 acts to resist the rotation of channel member 424 of the four bar linkage. The resistive element 440 is in one embodiment an oil filled shock absorber that offers variable resistance. Alternatively, the resistive element may be a hydraulic cylinder, a pneumatic cylinder, or suitable elastomeric device or material. Preferably, the resistive element will resist the reciprocation of the four-bar linkage with a combination of resilient and dissipative functionality.

As the users feet must be supported by the legs 420, 422 of the glider module 314, the legs 420, 422 of the glider module 314 are provided with foot rests 450 that are coupled to brackets 434. (FIG. 3A). Note that because of the nature of the operation of the glider module 314, it may be desirable to provide the foot rests with straps or the like (not shown) to ensure that the user's feet remain on the foot rests.

Knee braces 460 are attached to the legs 420, 422 by bars 462. The knee braces 460 are generally U-shaped to address and support the knees of the user. In one embodiment, the knee braces 460 include a retention member 461 that is passed around behind the knee brace 460 to ensure that the knee of the user remains in the knee brace 460. The knee brace 460 is adjustable by means of slots 463 formed in the end of bars 462. Threaded fasteners 465 passed through knee braces 460 and slots 463 to secure the knee braces to the bars.

The leftmost end of bar 462 has a slot 464 formed therein. This slot allows the bar 462 to slide with respect to the channel member 424. A pin 466 is passed through slot 464 and is secured to channel 424. A pin 468 is passed through an aperture and secured to channel 426. Bar 462 rotates around pin 468 as the four-bar linkage reciprocates through its range of motion. As bar 462 rotates around pin 468, the changing distance between pins 466 and 468 is accommodated by slot 464. Furthermore, the action of the four-bar linkage acts to keep the knee braces 460 in general alignment with the foot rests 450 such that the legs of the user are supported during the use of the glider module 314.

The legs 420, 422 are coupled to one another by a coupling 476 that constrains the legs 420, 422 to reciprocate in opposition to one another. Taken together, the action of legs 420, 422 and their respective handles approximates a walking motion for a user of the standing frame 310. Where the user's legs are not able to induce the legs to reciprocate, the user may apply force to the handles 438 in order to start and/or maintain the reciprocating motion of the legs 420, 422. The resistive element 440 will provide resistance that will exercise the user's arms and/or legs. Preferably, the resistive elements 440 are modifiable such that the level of resistance can be raised or lowered, depending on the needs of the user. Furthermore, where the user is not able to induce any movement in the legs 420, 422, the resistive elements 440 may be replaced with drive elements that are adapted to drive the legs of the glider module 314. Further details of the glider module 314 are provided in the '557 application.

FIGS. 5A-9C illustrate an exemplary embodiment of a seat 500 that may be used in a wide variety of different applications, such as, for example, as the seat in the standing frame disclosed by the '557 application. The seat is 500 includes a frame 502 and is moveable between a seating orientation (FIGS. 5A-5C) that allows a user to sit on the seat to a standing orientation (FIGS. 9A-9C) where the seat at least partially supports the user in a standing posture. The seat 500 is moved between the seating orientation and the standing orientation by a linear actuator 506 (See FIG. 5B), which may be a hydraulic, pneumatic, or electric linear actuator. The seat includes a rearward support portion 508 and a forward support portion 510. A middle portion 511 is fixed to the rearward support portion 508. The forward support portion 510 includes first and second side portions 513, 515 that are disposed on opposite sides of the middle portion 511.

Figure 5B:
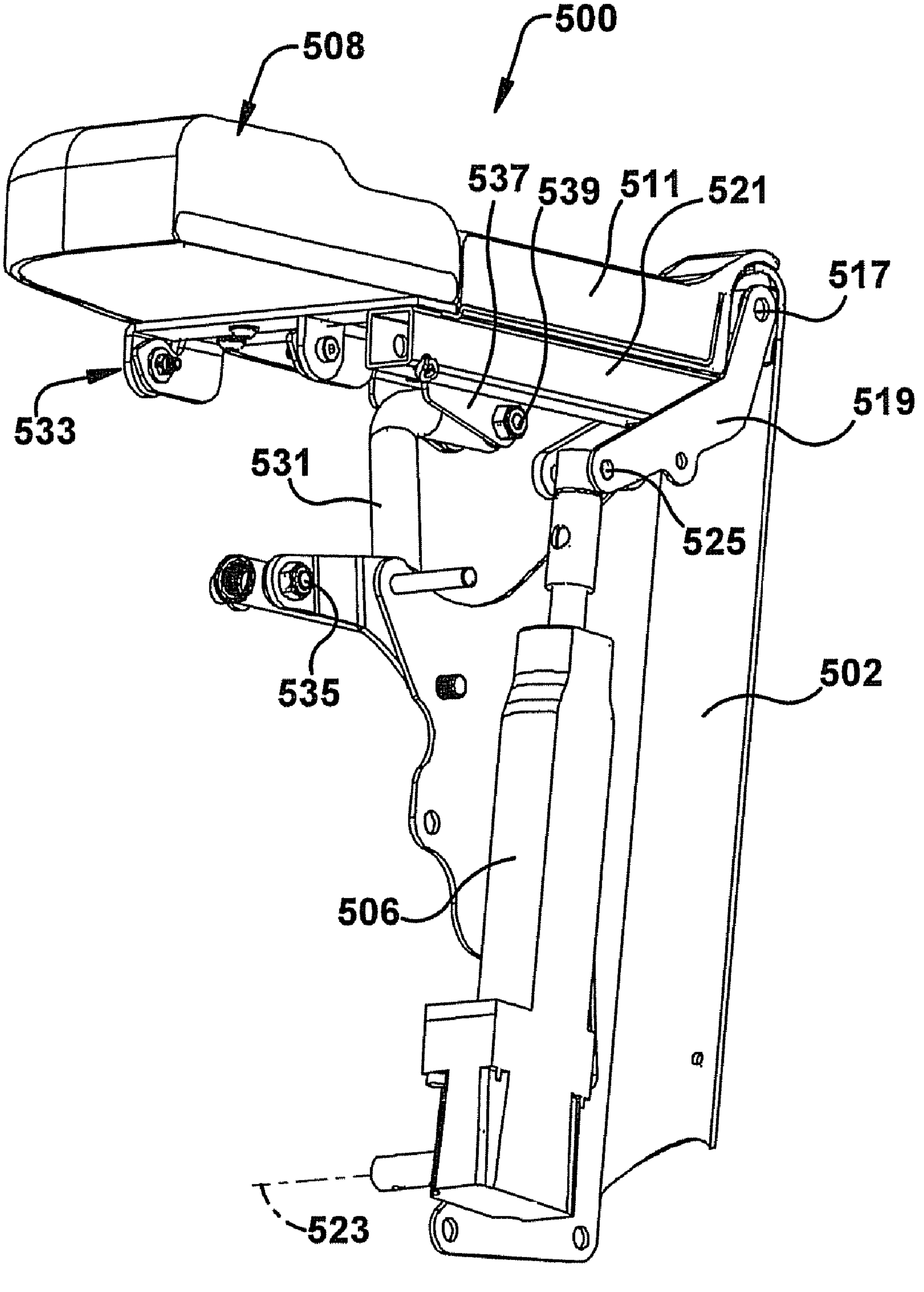
FIG. 5B is a sectioned perspective view of the seat shown in FIG. 5A.
Figure 5C:
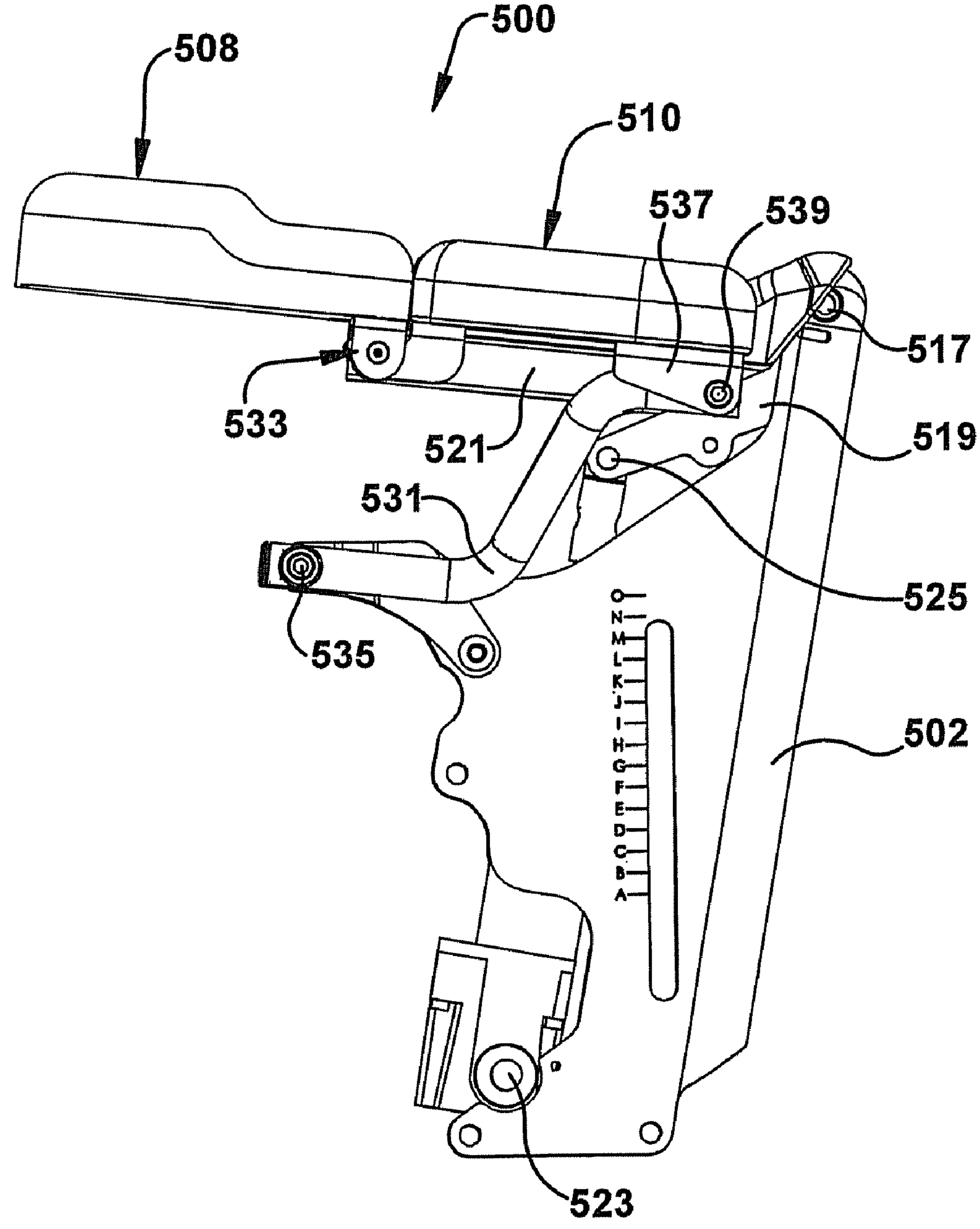
FIG. 5C is a side elevation view of the seat shown in FIG. 5A.
Figure 6A:
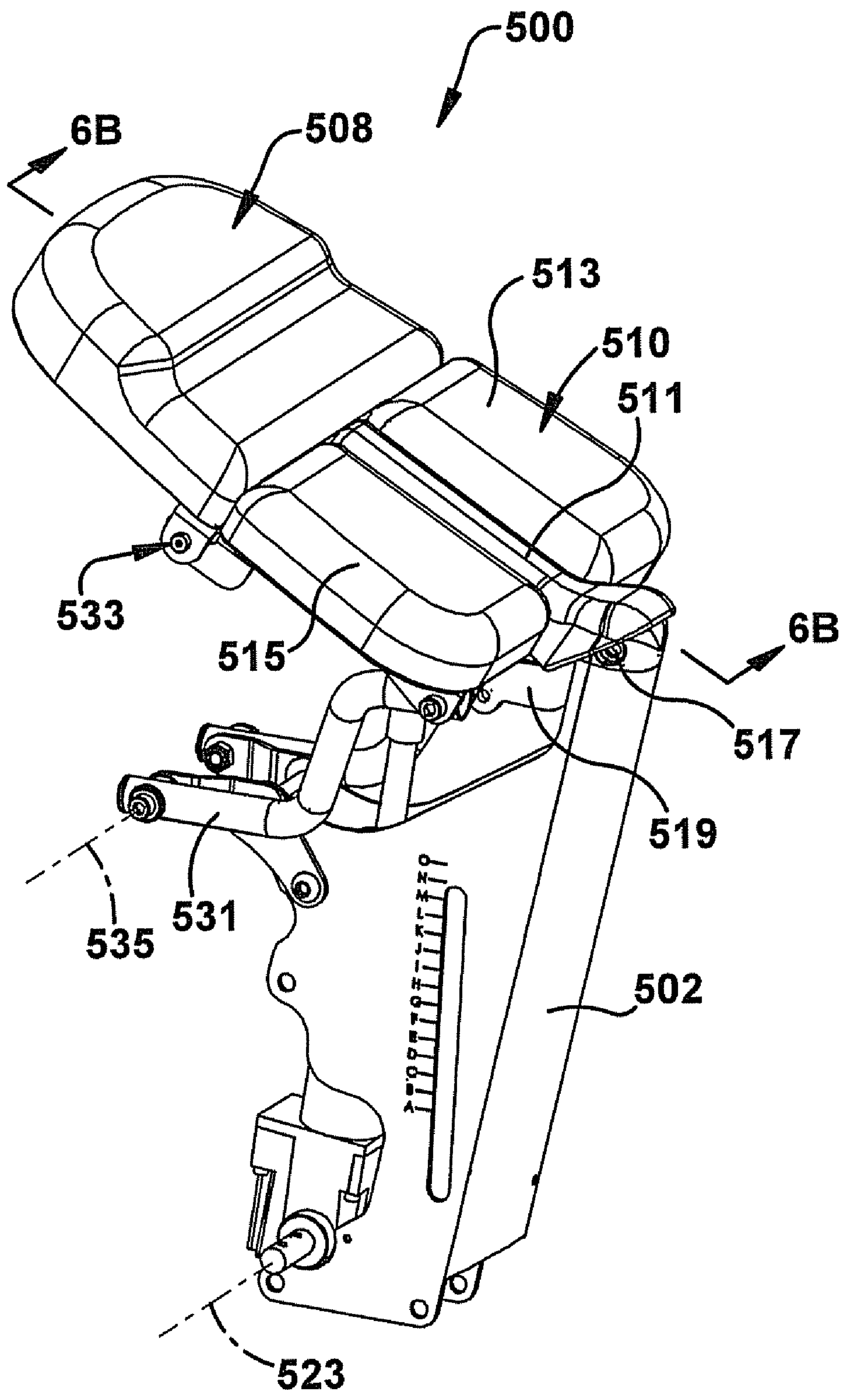
FIG. 6A is a perspective view of the seat of FIG. 5A at a first orientation between the seated orientation and a standing orientation.
Figure 6B:
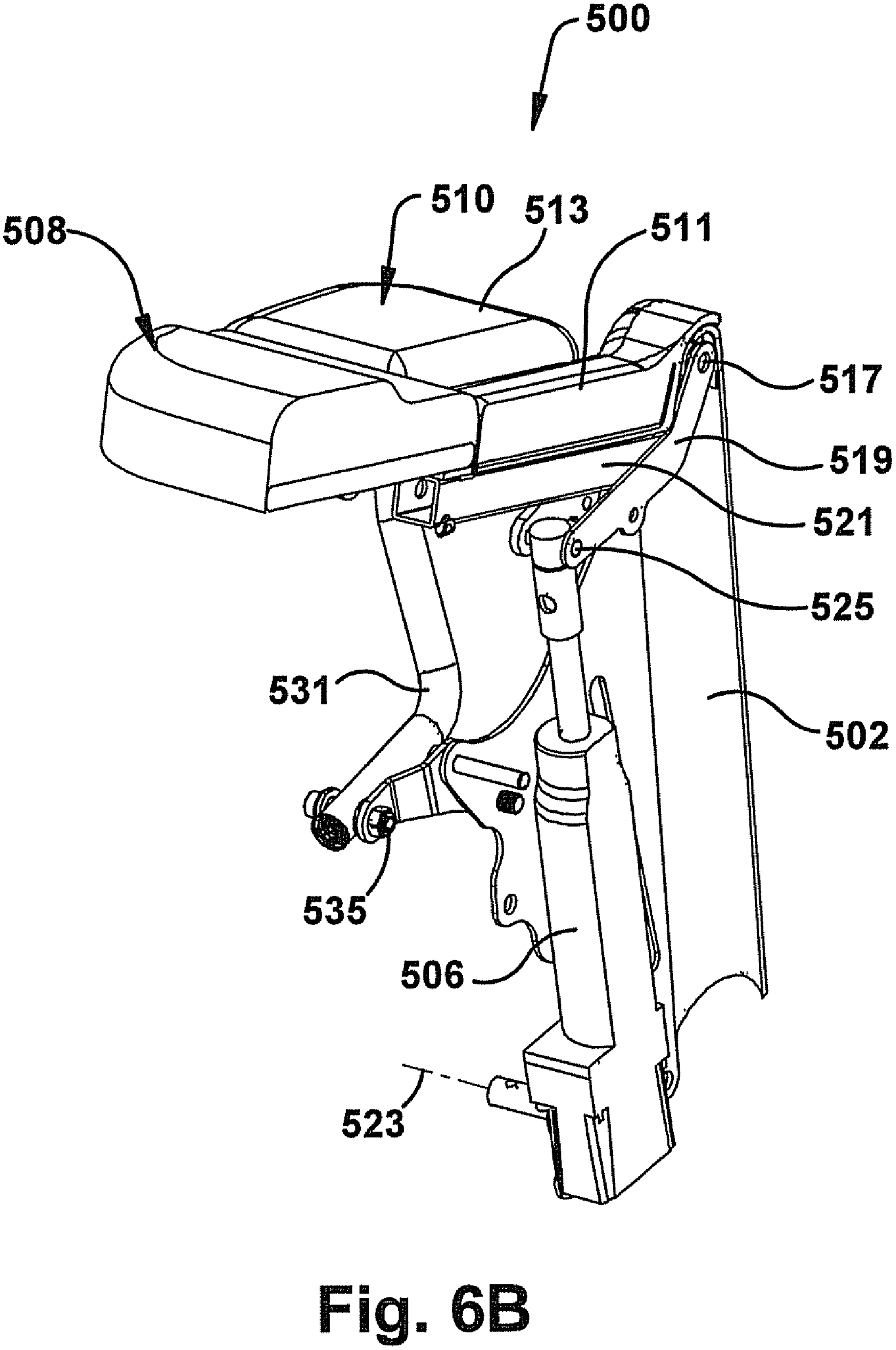
FIG. 6B is a sectioned perspective view of the seat shown in FIG. 6A with the section taken as approximated by lines 6B-6B in FIG. 6A.
Figure 6C:
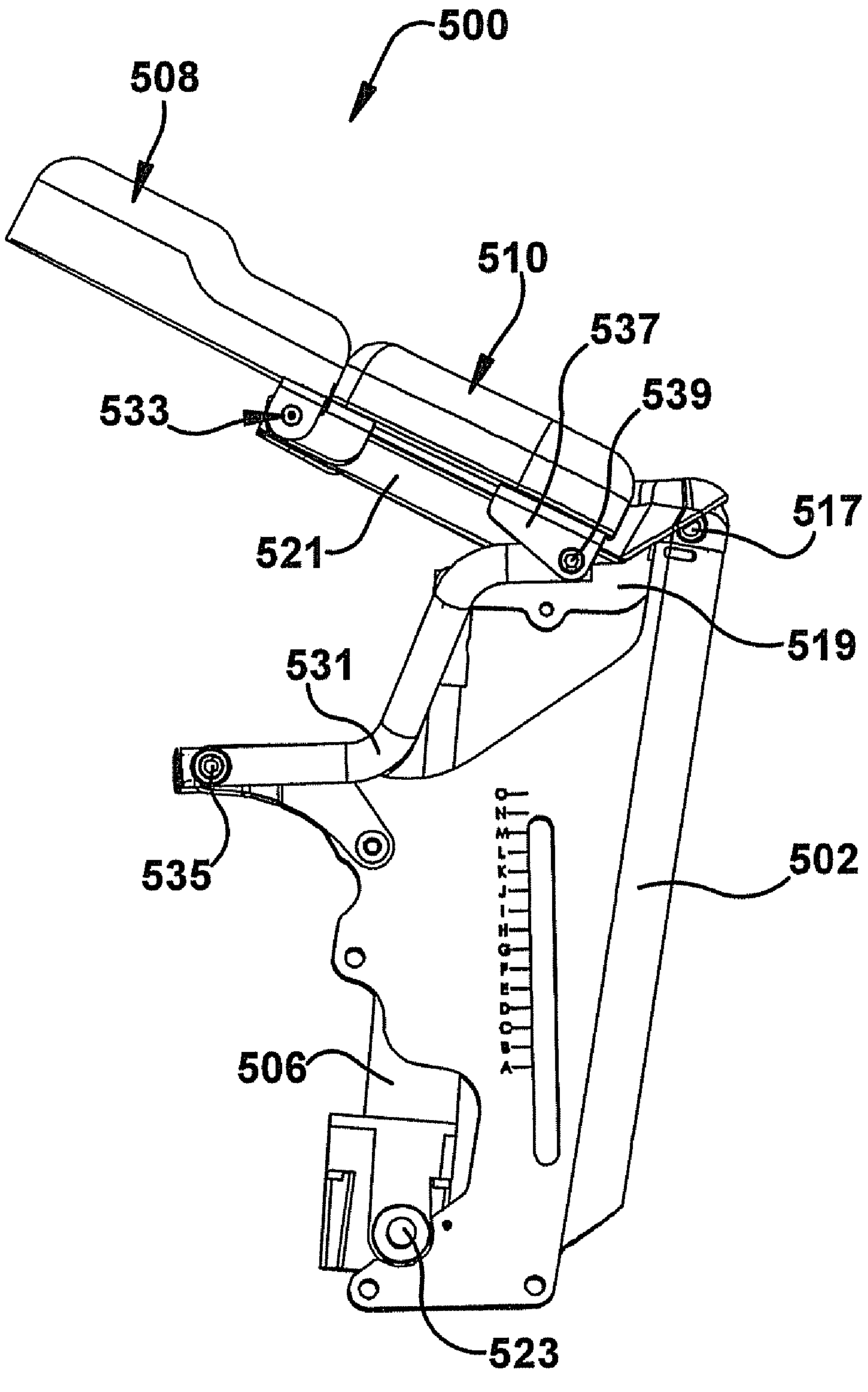
FIG. 6C is a side elevation view of the seat shown in FIG. 6A.
Figure 7A:
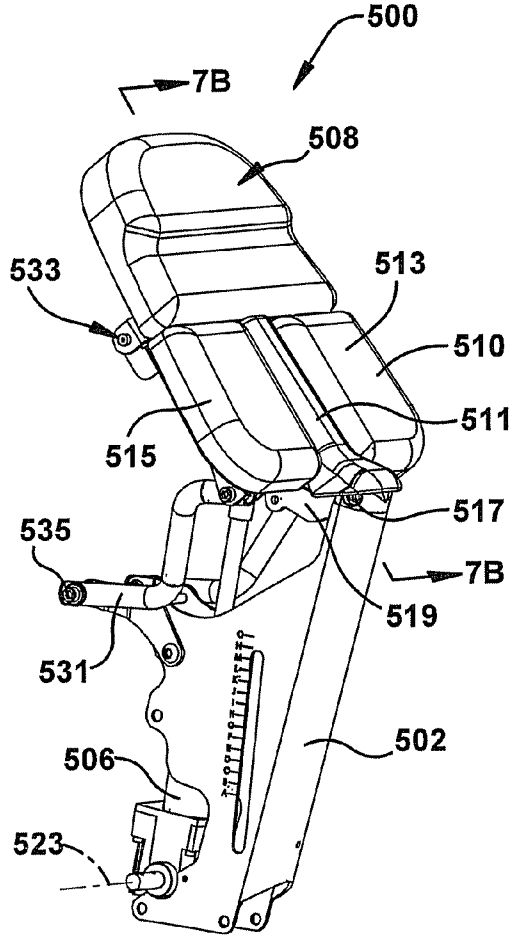
FIG. 7A is a perspective view of the seat of FIG. 5A at a second orientation between the seated orientation and the standing orientation.
Figure 7B:
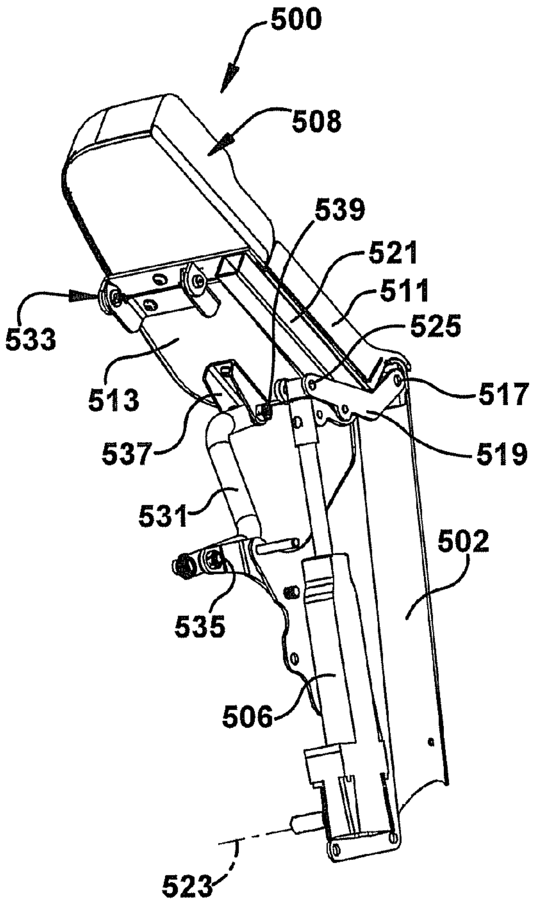
FIG. 7B is a sectioned perspective view of the seat shown in FIG. 7A with the section taken as approximated by lines 7B-7B in FIG. 7A.
Figure 7C:
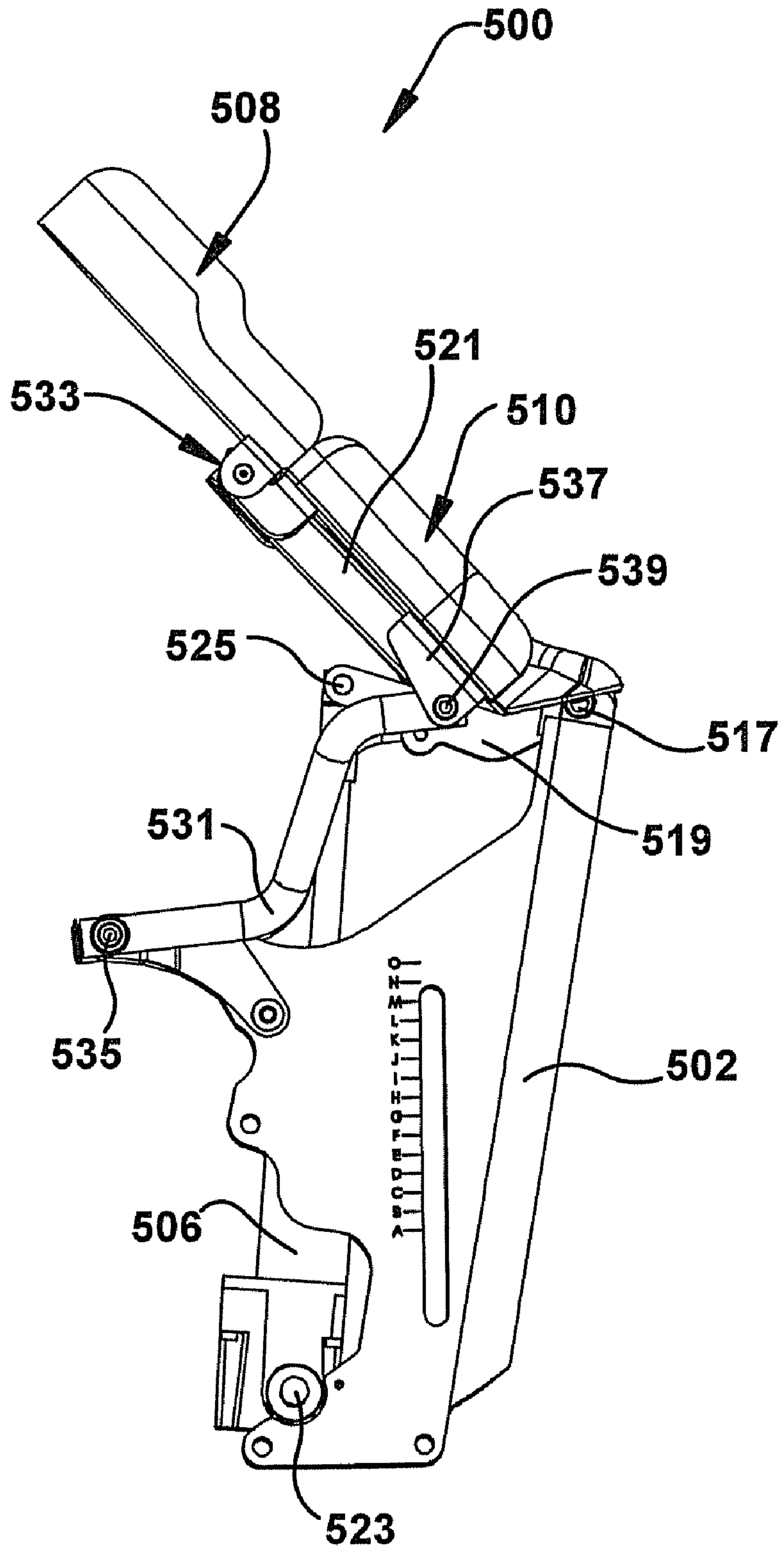
FIG. 7C is a side elevation view of the seat shown in FIG. 7A.
Figure 8A:
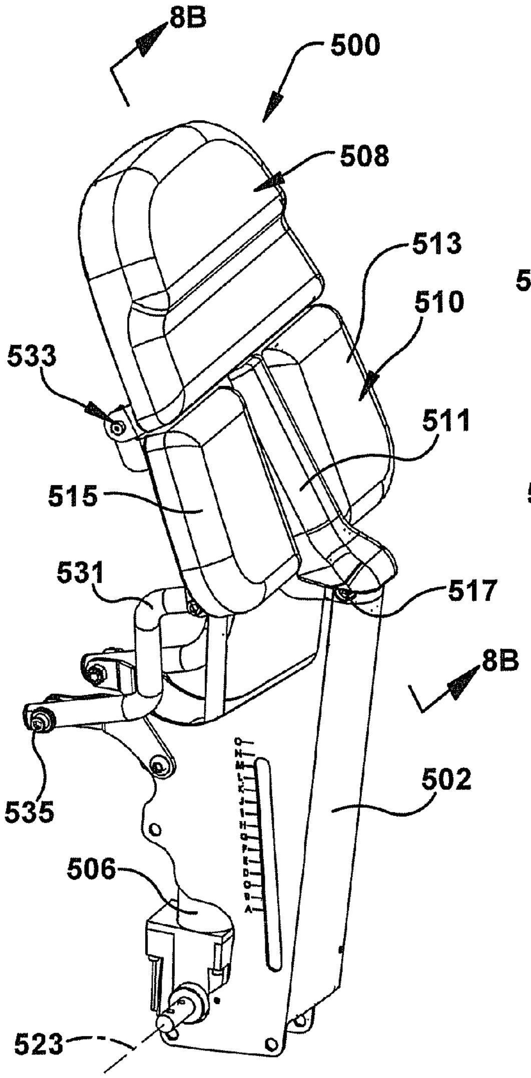
FIG. 8A is a perspective view of the seat of FIG. 5A at a third orientation between the seated orientation and the standing orientation.
Figure 8B:
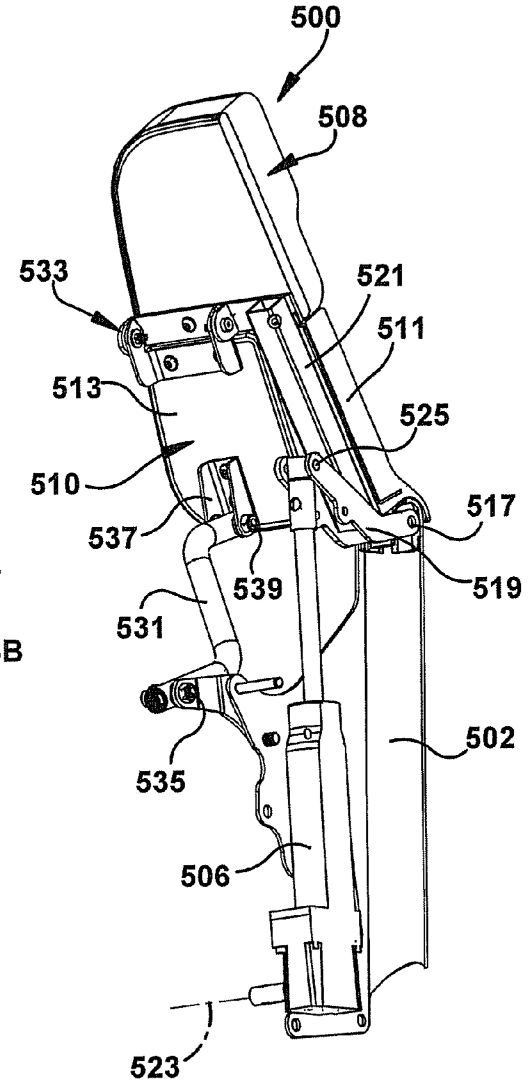
FIG. 8B is a sectioned perspective view of the seat shown in FIG. 8A with the section taken as approximated by lines 8B-8B in FIG. 8A.
Figure 8C:
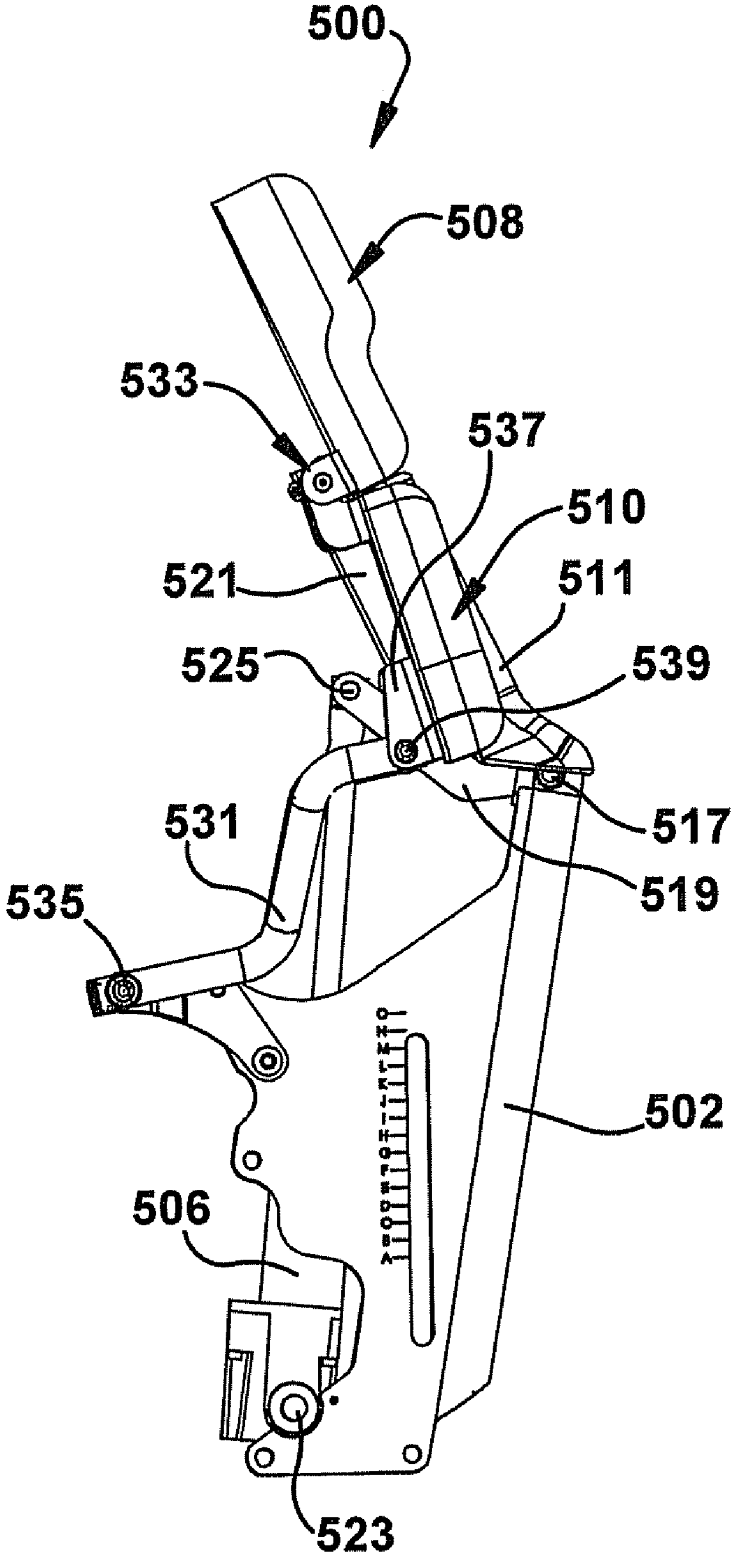
FIG. 8C is a side elevation view of the seat shown in FIG. 8A.

Referring to FIG. 5B, the middle portion 511 is pivotably coupled to the frame 502 at a pivot axis 517. In particular, brackets 519, 521 are fixed to the middle portion 511 and are pivotably coupled to the frame 502 at the pivot axis 517. The linear actuator 506 is pivotably coupled to the frame at a pivot axis 523 and to the bracket 519 at a pivot axis 525 (FIG. 5B). As a result, extension and retraction of the linear actuator pivots the rearward support portion 508 and middle portion 511 about the pivot axis 517 as illustrated by FIGS. 5-9.

Figure 9A:
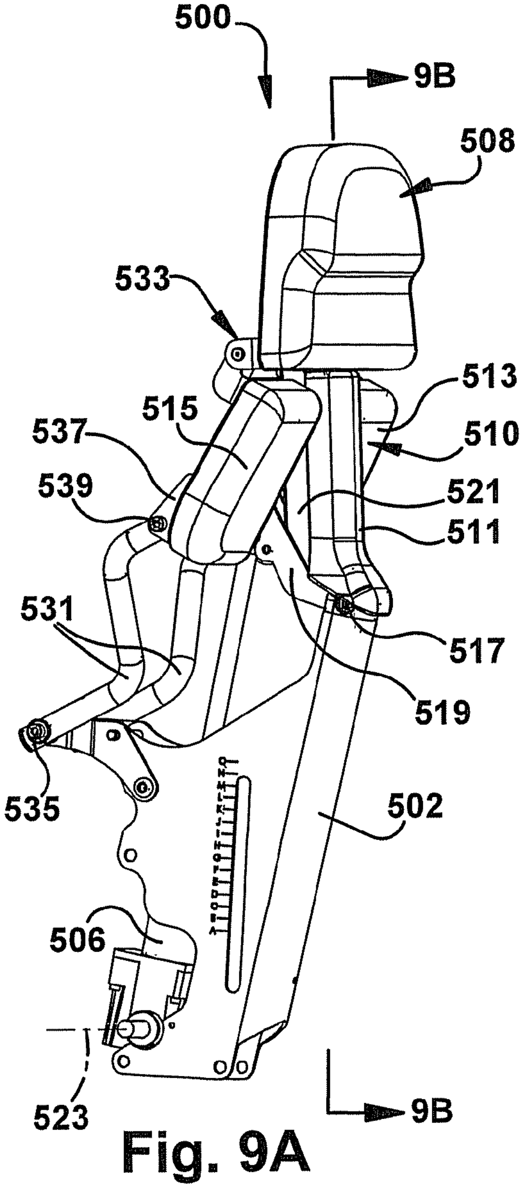
FIG. 9A is a perspective view of the seat of FIG. 5A at the standing orientation.
Figure 9B:
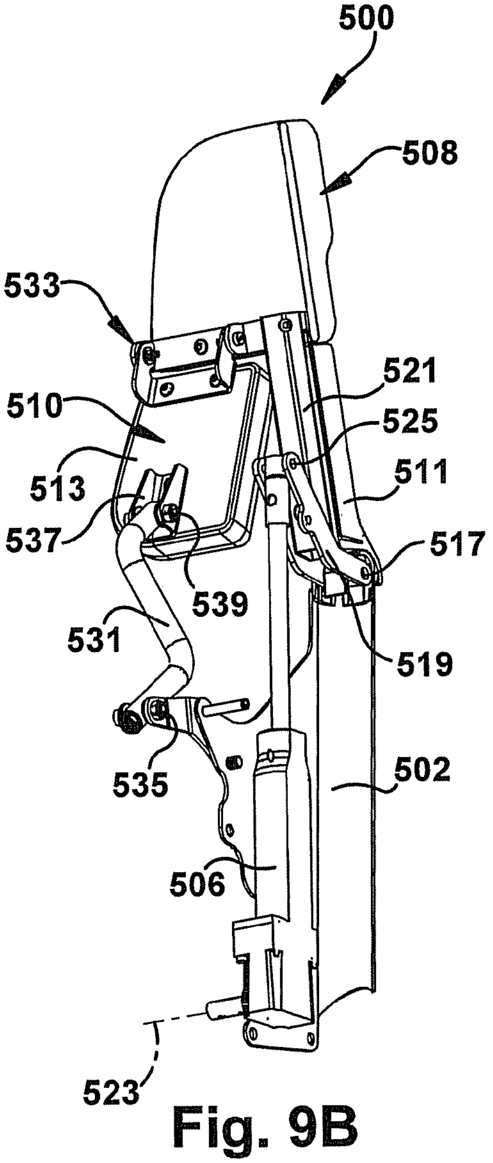
FIG. 9B is a sectioned perspective view of the seat shown in FIG. 9A with the section taken as approximated by lines 9B-9B in FIG. 9A.
Figure 9C:
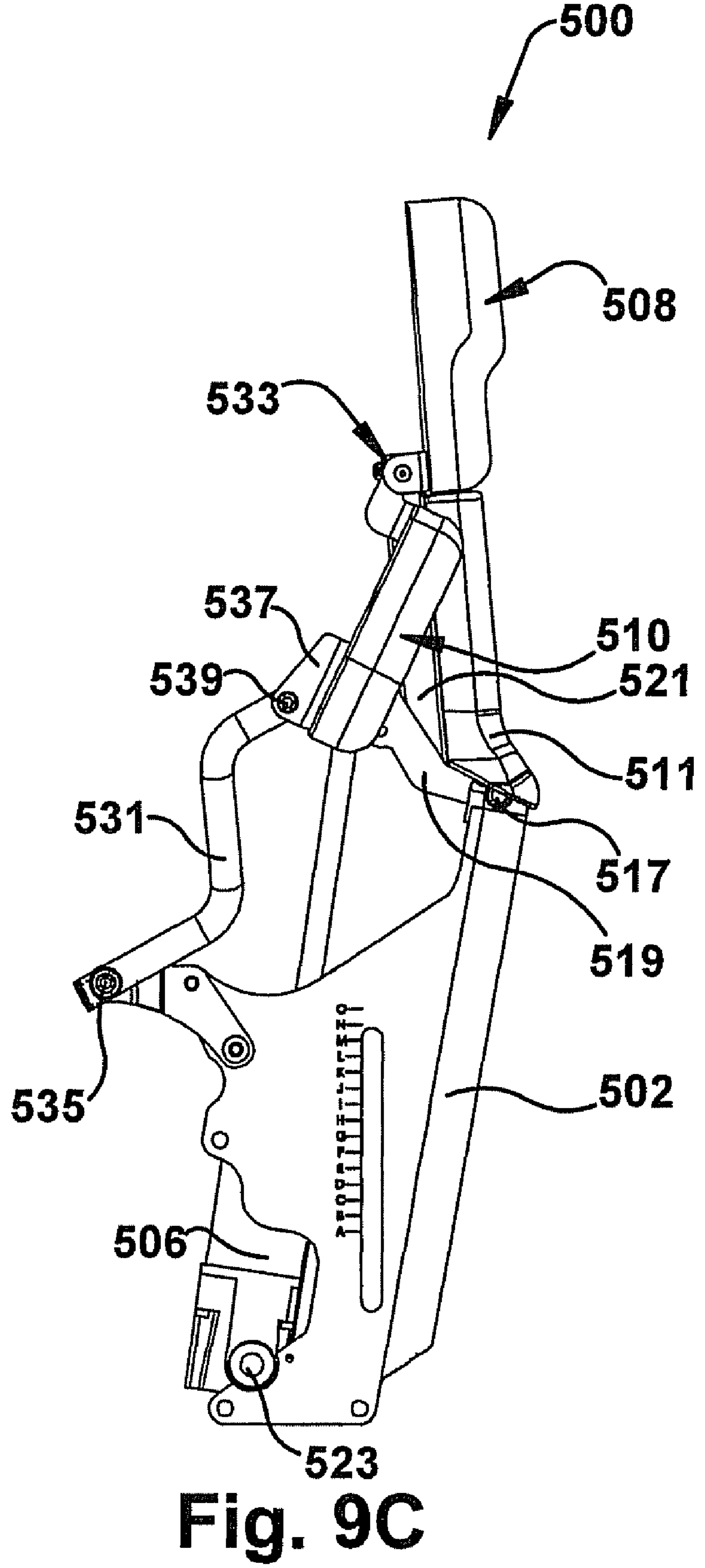
FIG. 9C is a side elevation view of the seat shown in FIG. 9A.

In the example illustrated by FIGS. 5A-9C, the rearward support portion 508 is configured to engage the user's buttocks when the seat is in the seating orientation and the forward support portion 510 is configured to engage the user's legs, such as the user's thighs or other portion of the user's legs when the seat is in the seating orientation. Referring to FIGS. 9A-9C, the forward support portion 510 is configured to at least partially move away from the user's legs when the seat 500 is in the standing orientation.

In the example illustrated by FIGS. 5A-9C, the forward support portion 510 is moved away from the user's legs by links 531. The forward support side portions 513, 515 are pivotably coupled to rearward support portion by hinges 533 (FIG. 5B shows the hinge that connects the side portion 513. The hinge that connects the side portion 515 is identical). The links 531 are pivotably coupled to the frame 512 at a pivot axis 535 and are pivotably coupled to the forward support side portions 513, 515 by brackets 537 at a pivot axis 539. The length of the links 531 and positioning of the pivot axes 535, 539 control the pivotable movement of the forward support portion 510 with respect to the rearward support portion 508 as the rearward support portion is pivoted about the pivot axis 517.

In the example illustrated by FIGS. 5A-9C, the length of the links 531 is selected to maintain the forward support portion 510 in substantial alignment with the rearward support portion 508 from the seating orientation until the seat has been moved nearly to the standing orientation. In the seating orientation illustrated by FIGS. 5A-5C, the forward support portion 510 and the rearward support portion 508 are substantially aligned. In the intermediate positions illustrated by FIGS. 6A-6C, and 7A-7C, the forward support portion 510 and the rearward support portion 508 remain substantially aligned. In the more upright intermediate position illustrated by FIGS. 8A-8C, the links 531 begin to pull the forward support portion 508 and pivot the forward support portion about the hinges 533 away from the user's legs. The links 531 continue pulling the forward support portion 508 back as the seat 500 is moved to the standing orientation illustrated by FIGS. 9A-9C.

FIGS. 10A-14C illustrate an exemplary embodiment of a seat assembly 1000 that includes a frame 1001 and is moveable between a seating orientation (FIGS. 10A-10D) that allows a user to sit on the seat assembly to a standing orientation (FIGS. 14A-14C) where the seat assembly at least partially supports the user in a standing posture. The seat assembly 1000 comprises a seat 500 and a seat back 1002. The seat 500 is described with reference to FIGS. 5A-9C and therefore is not described again in detail.

Figure 14B:
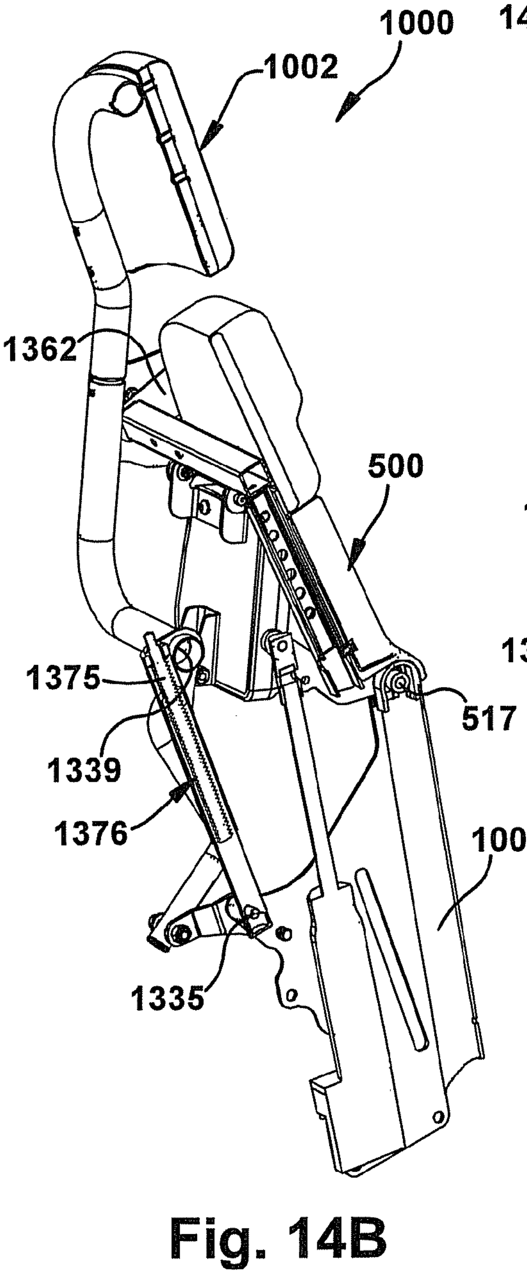
FIG. 14B is a sectioned perspective view of the seat assembly shown in FIG. 14A with the section taken as approximated by lines 14B-14B in FIG. 14A.
Figure 14A:
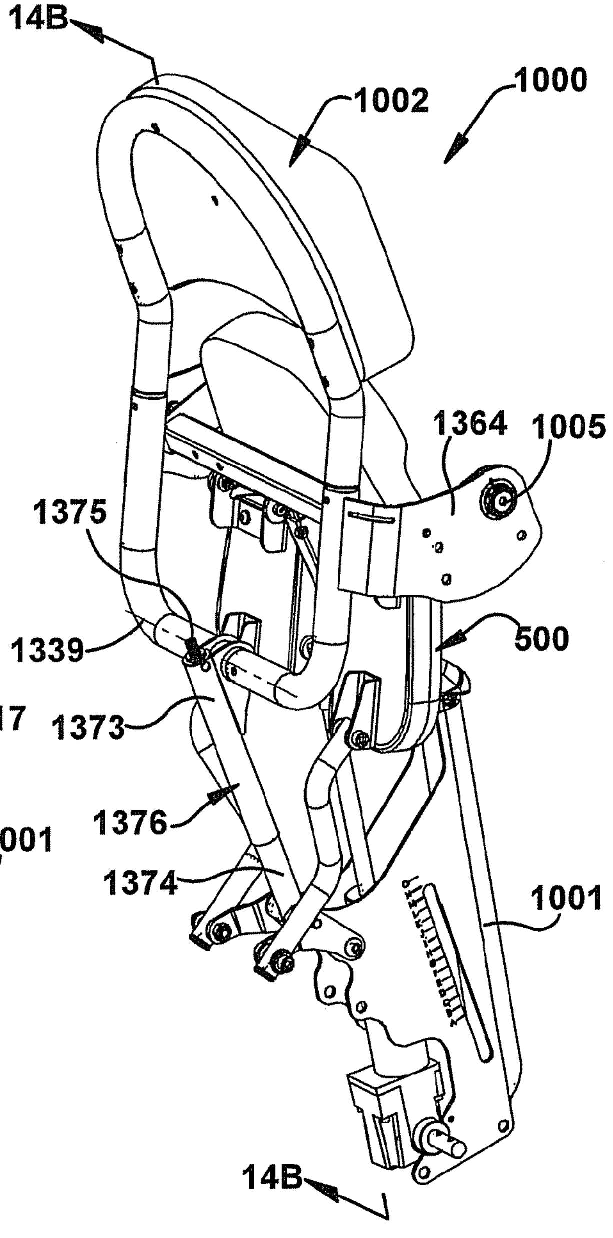
FIG. 14A is a perspective view of the seat assembly of FIG. 10A at the standing orientation.
Figure 14C:
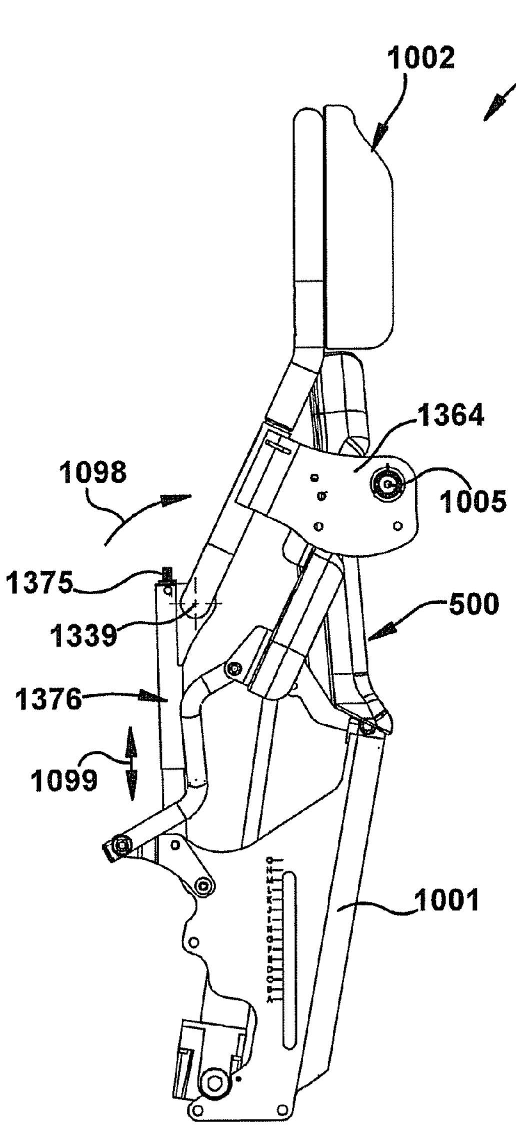
FIG. 14C is a side elevation view of the seat assembly shown in FIG. 14A.

The seat back 1002 is coupled to the seat 500. In the example illustrated by FIGS. 10A-14C, the seat back 1002 is coupled to the seat 500 such that the orientation of the seat back 1002 with respect to a support surface, such as a floor is maintained as the seat is moved between the seating orientation (FIGS. 10A-10C) and the standing orientation (FIGS. 14A-14C). The orientation of the seat back 1002 is adjustable and may be selected based on the user's need and comfort.

The seat back 1002 is pivotably coupled to the seat 500 at a pivot axis 1005. More particularly, brackets 1362 are fixed to opposite sides of the seat 500 and brackets 1364 are fixed to opposite sides of the seat back 1002. The brackets 1362 are pivotably coupled to the brackets 1364 at the pivot axis 1005. In this manner, the seat back 1002 is coupled to the seat 500 and yet is free to rotate with respect thereto. The brackets 1362, 1364 may be adjustable to allow the seat back 1002 to be moved forward and backward and/or up and down to accommodate for variations in physical attributes of the users.

In the example illustrated by FIGS. 10A-14C, motion of the seat back 1002 with respect to the seat is controlled by an adjustable length link 1376. The link 1376 is pivotably coupled to the frame 1001 at a pivot axis 1335 (FIG. 10B) and is pivotably coupled to the seat back 1002 at a pivot axis 1339. The length of the link 1376 and positioning of the pivot axes 1335, 1339, and 1005 control the movement of the seat back 1002 with respect to the seat 500 as the seat is moved between the seating orientation and the standing orientation. In the example illustrated by FIGS. 10A-14C, the length of the link 1376 and positioning of the pivot axes 1335, 1339, and 1005 are selected to substantially maintain the orientation seat back 1002 with respect to the support surface or floor (not shown) as the seat is moved between the seating and standing orientations.

Figure 10B:
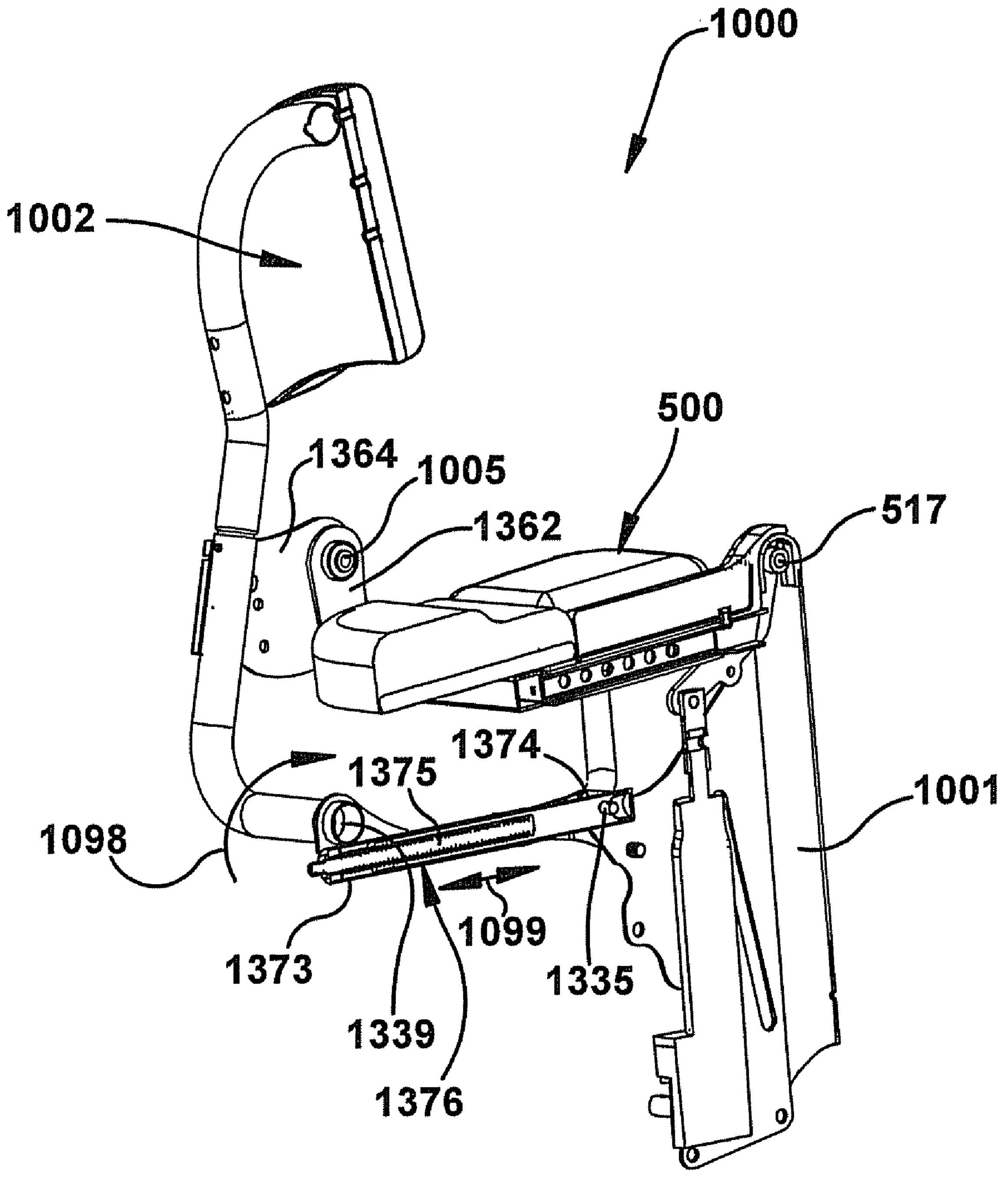
FIG. 10B is a sectioned perspective view of the seat assembly shown in FIG. 10A with the section taken as approximated by lines 10B-10B in FIG. 10A.
Figure 10C:
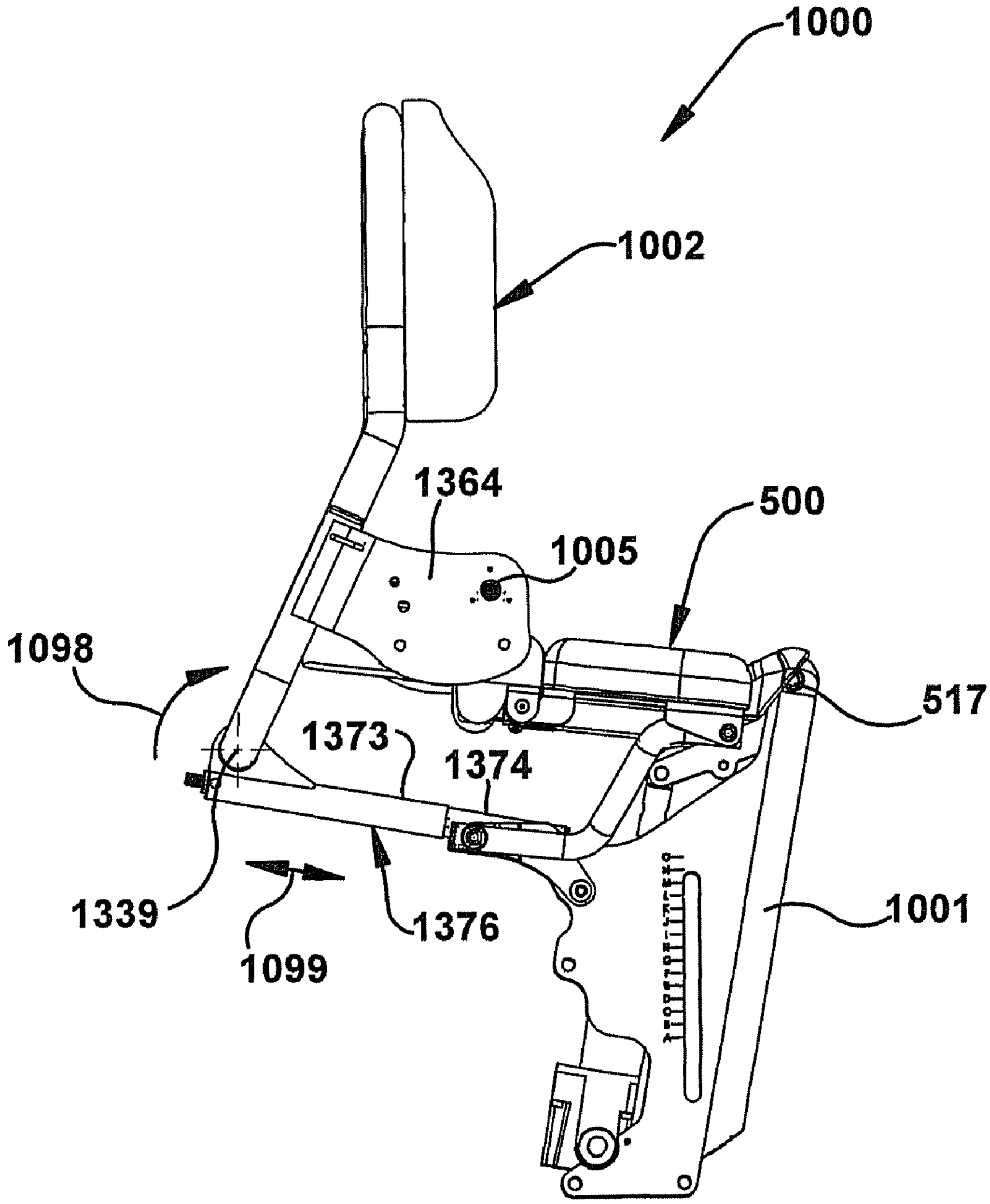
FIG. 10C is a side elevation view of the seat assembly shown in FIG. 10A.
Figure 11A:
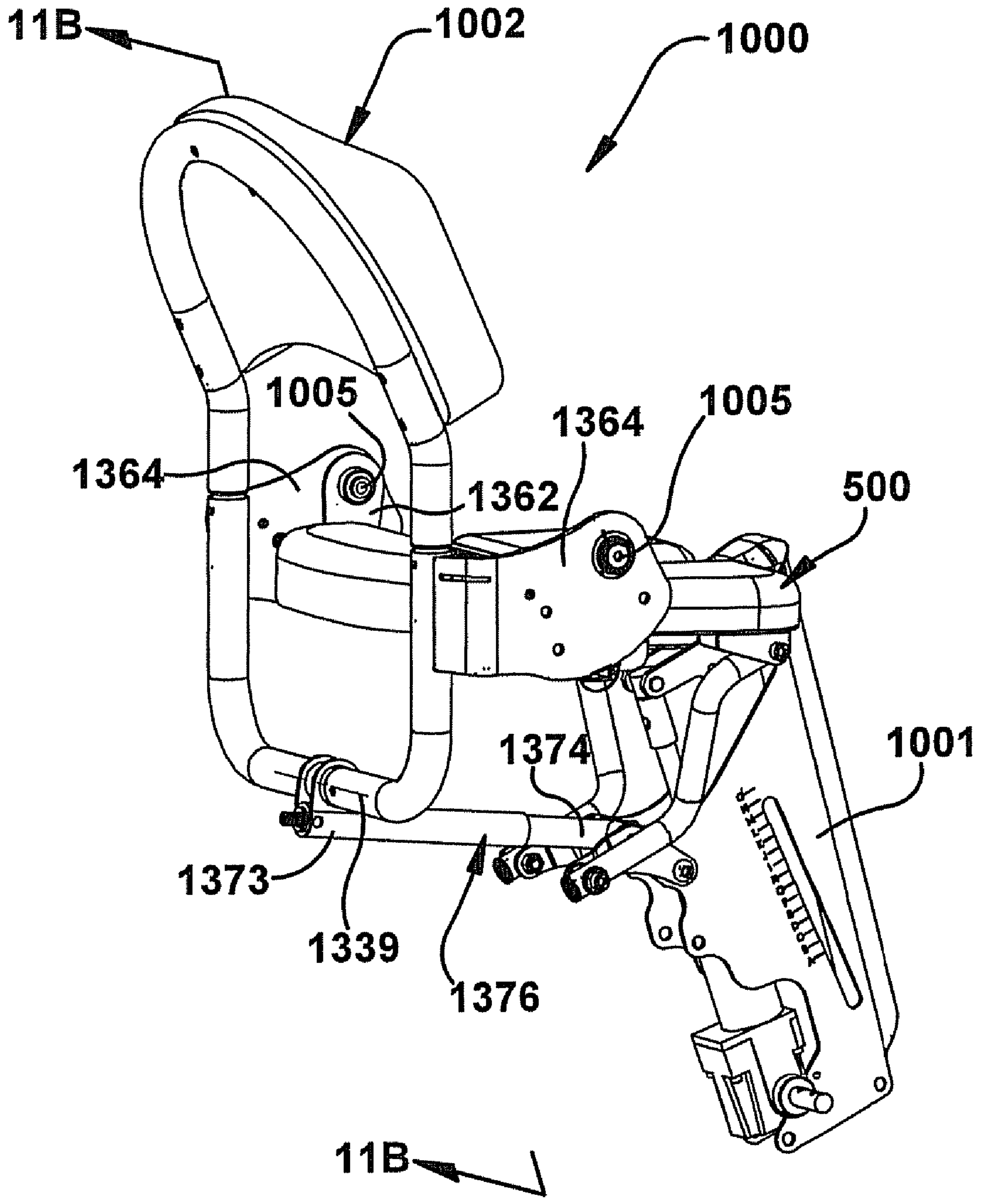
FIG. 11A is a perspective view of the seat assembly of FIG. 10A at a first orientation between the seated orientation and a standing orientation.
Figure 11C:
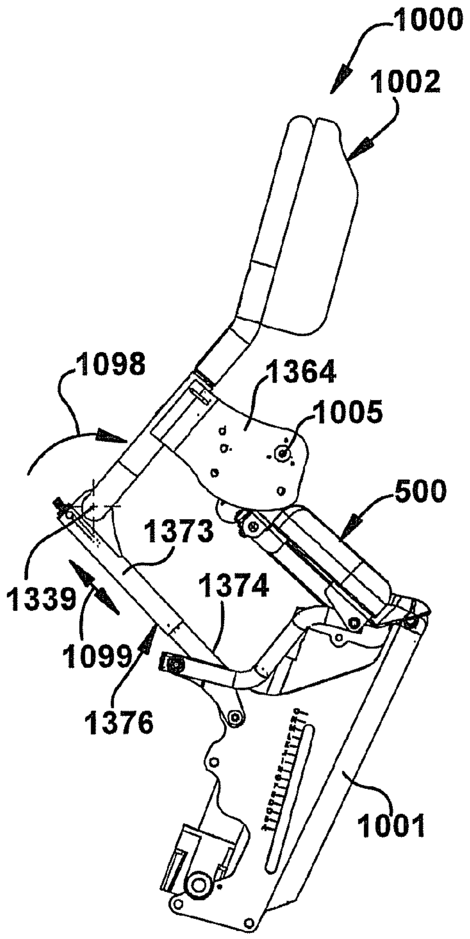
FIG. 11C is a side elevation view of the seat assembly shown in FIG. 11A.
Figure 11B:
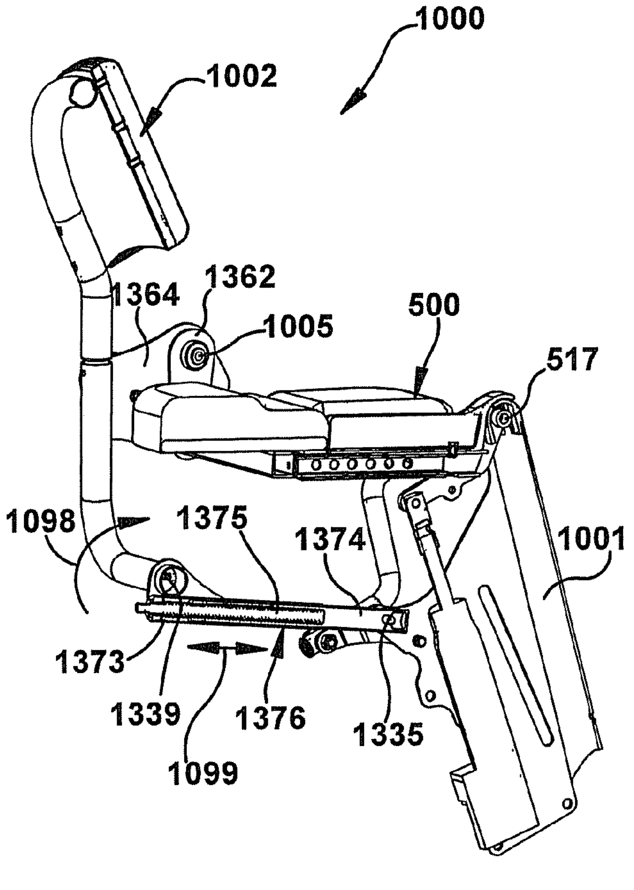
FIG. 11B is a sectioned perspective view of the seat assembly shown in FIG. 11A with the section taken as approximated by lines 11B-11B in FIG. 11A.
Figure 12B:
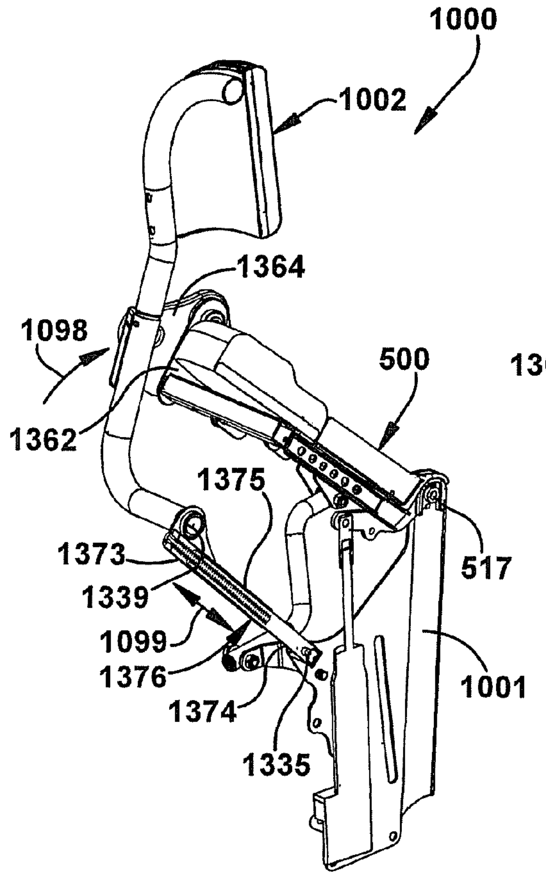
FIG. 12B is a sectioned perspective view of the seat assembly shown in FIG. 12A with the section taken as approximated by lines 12B-12B in FIG. 12A.
Figure 12A:
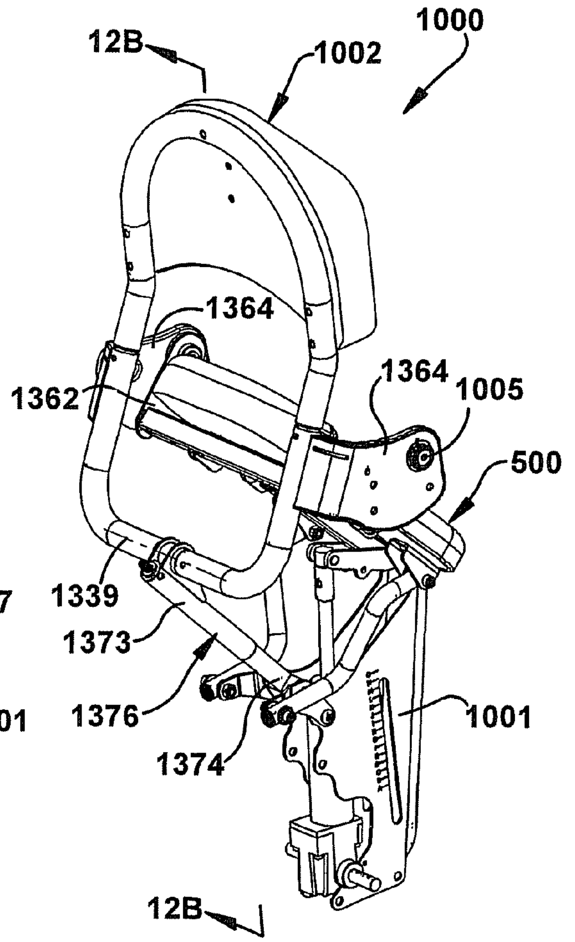
FIG. 12A is a perspective view of the seat assembly of FIG. 10A at a second orientation between the seated orientation and the standing orientation.
Figure 12C:
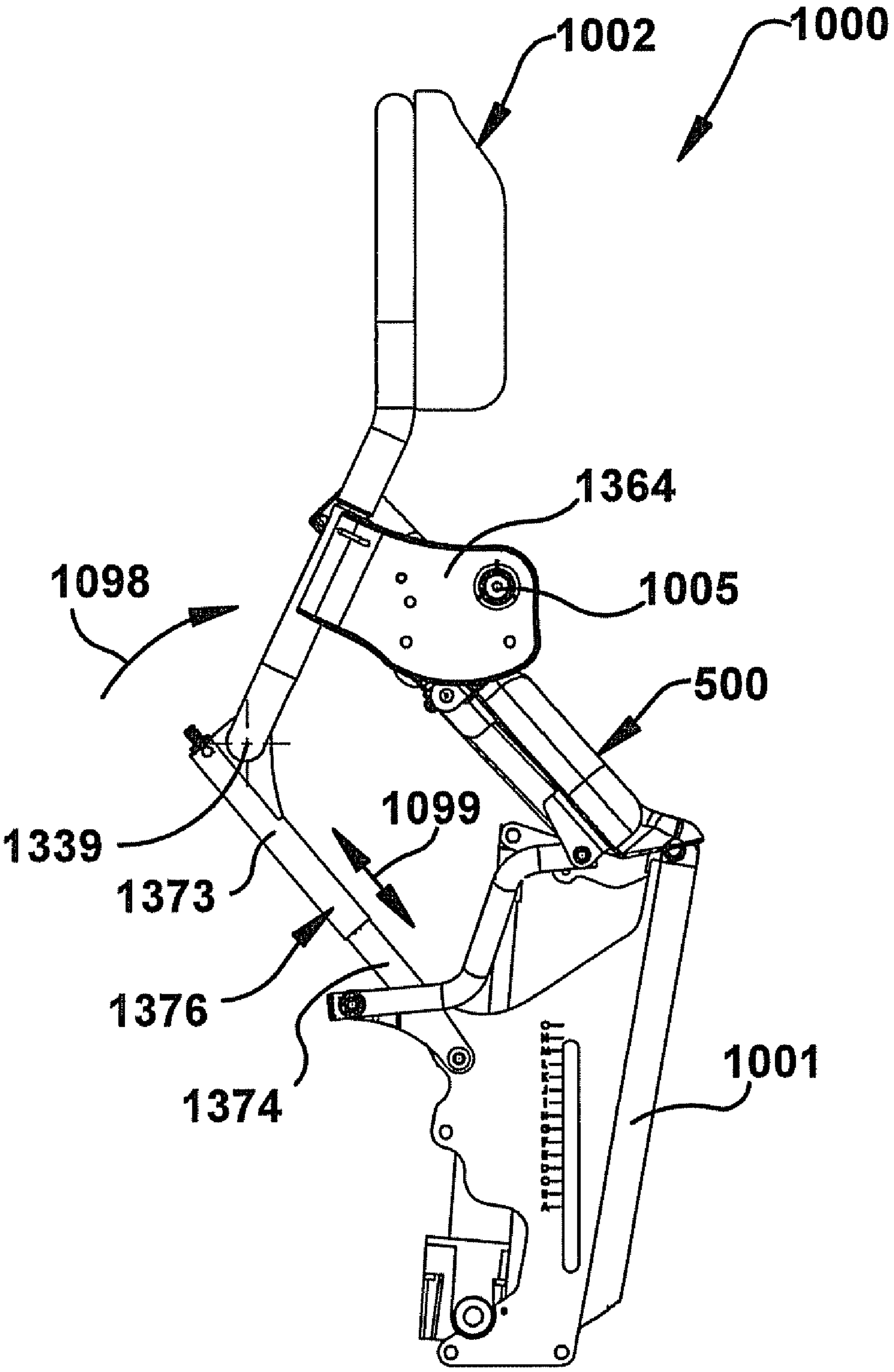
FIG. 12C is a side elevation view of the seat assembly shown in FIG. 12A.
Figure 13A:
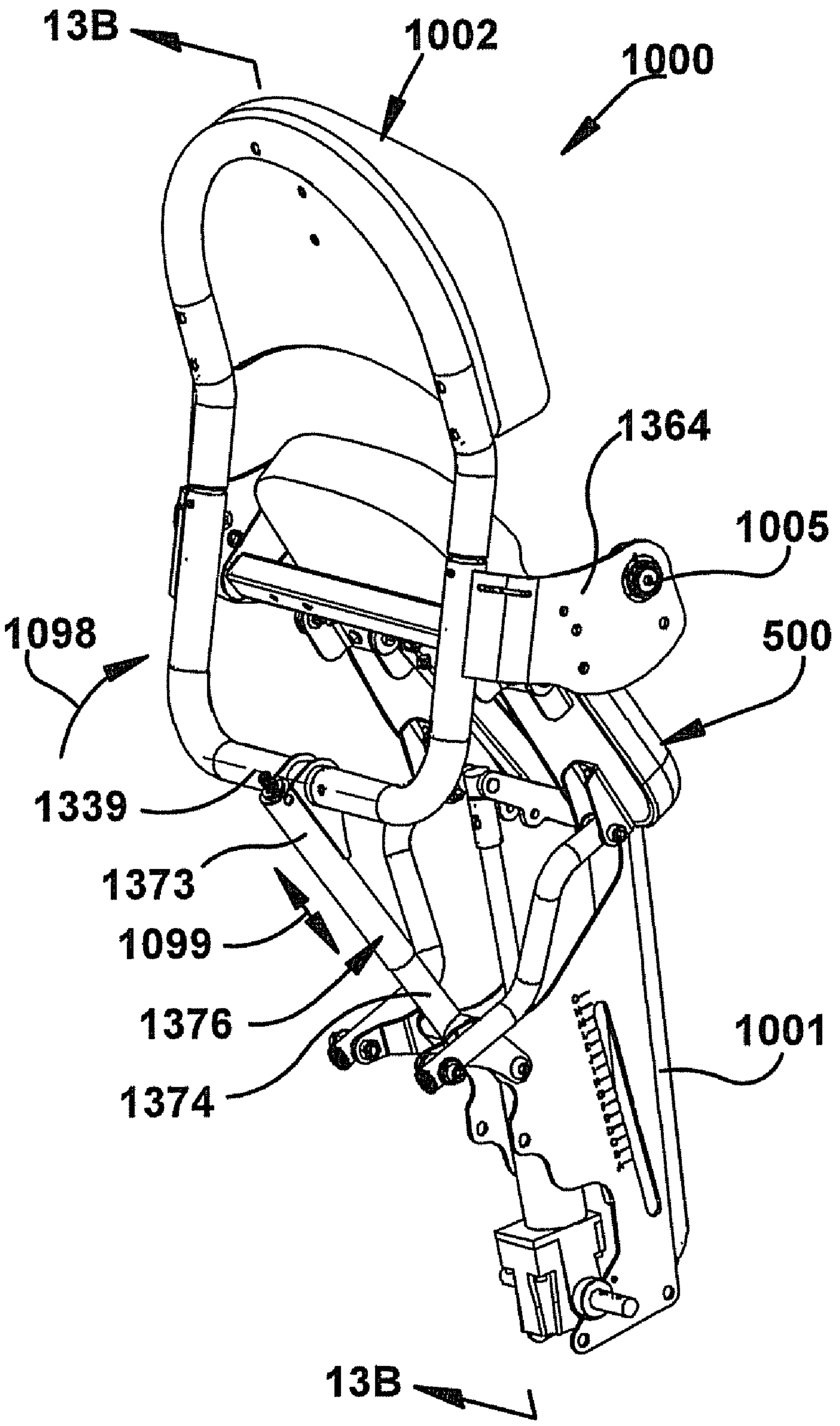
FIG. 13A is a perspective view of the seat assembly of FIG. 10A at a third orientation between the seated orientation and the standing orientation.
Figure 13B:
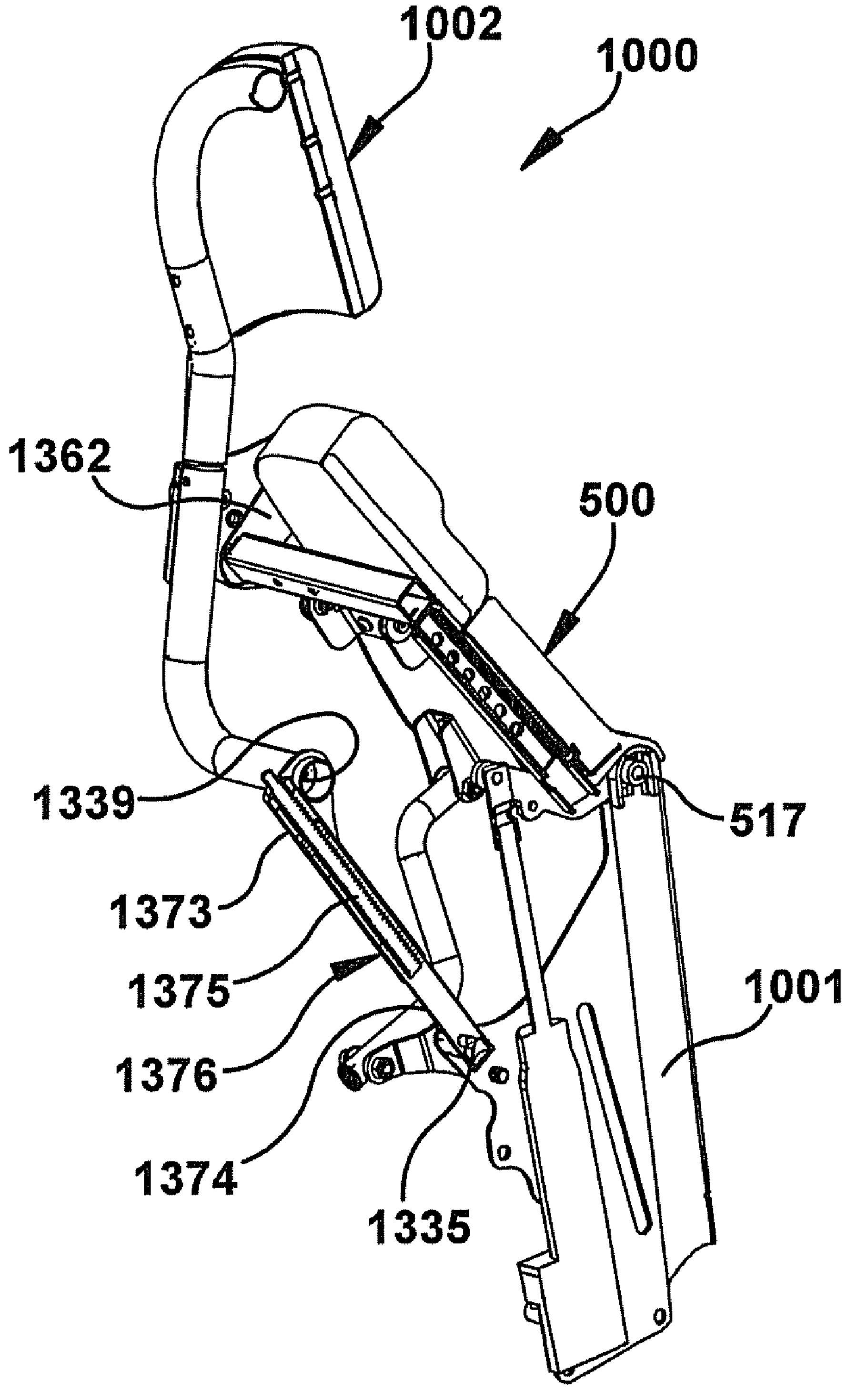
FIG. 13B is a sectioned perspective view of the seat assembly shown in FIG. 13A with the section taken as approximated by lines 13B-13B in FIG. 13A.
Figure 13C:
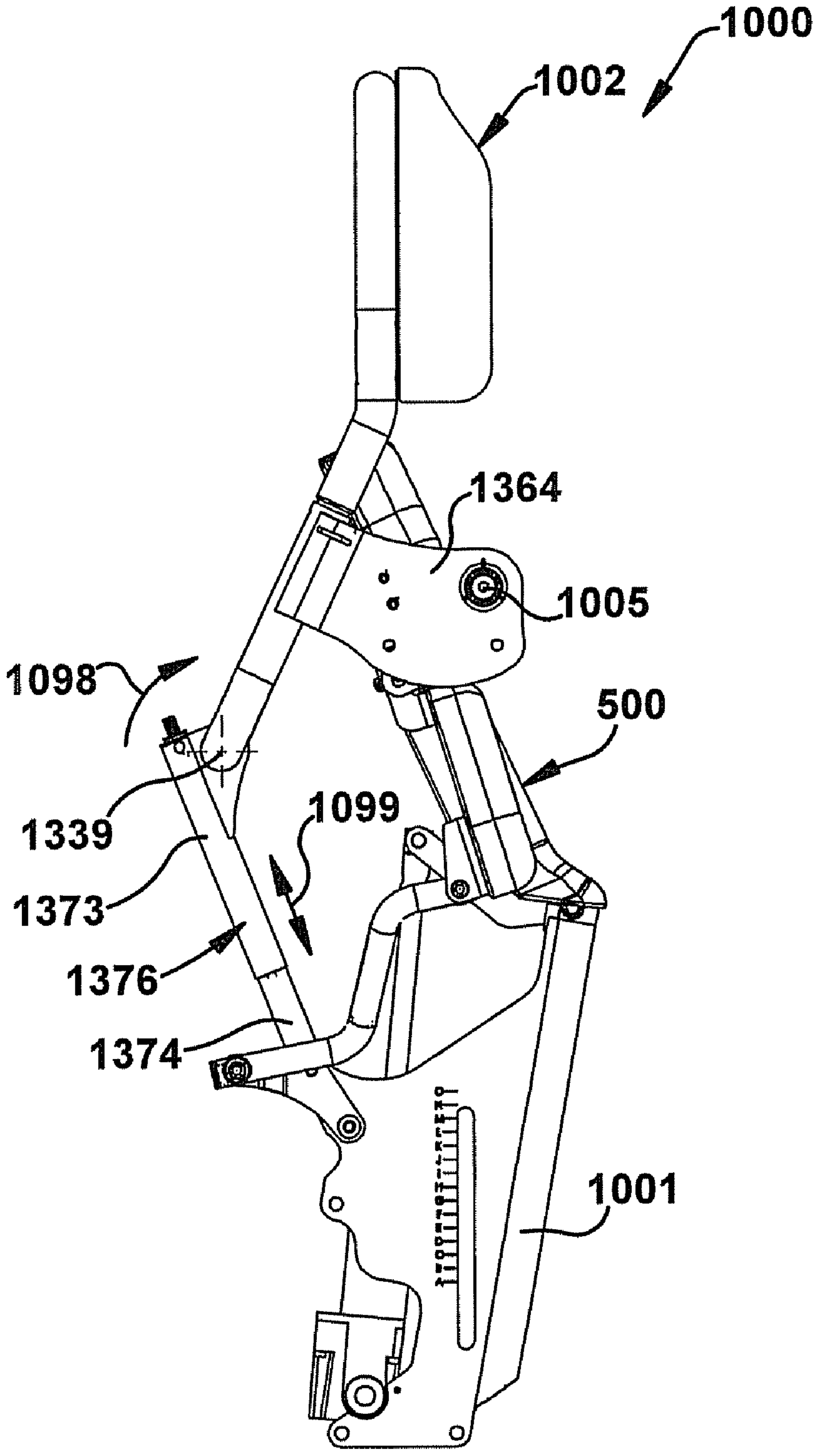
FIG. 13C is a side elevation view of the seat assembly shown in FIG. 13A.

The adjustable length link 1376 allows the distance between the pivot axes 1335, 1339 to be modified. Referring to FIG. 10B, in one embodiment the adjustable length link comprises of an outer sleeve 1373 pivotably coupled to the seat back 1002 and an inner sleeve 1374 pivotably coupled to the frame that is received within the outer sleeve 1373. A screw 1375 extends or retracts the inner sleeve 1374 to modify the length of the adjustment member 1376.

The seat 500, seat back 1002, adjustment mechanism 1376, and frame 1001 form a four-bar linkage. In one embodiment, the lengths of the links are selected to substantially maintain the users back in the same orientation with respect to the ground in both the sitting and standing postures and optionally in transition therebetween. For example, the distances between the pivot axes 517, 1005, 1335, 1339 can be selected to form a parallelogram linkage and the orientation of the seat back 1002 with respect to the ground is maintained from the sitting position to the standing position. The angle of the seat back 1002 may be adjusted by the adjustable length link 1376. For example, increasing the length of the link 1376 as indicated by arrow 1099 causes the seat back 1002 to rotate forward as indicated by arrow 1098. Conversely, decreasing the length of the link 1376 causes the seat back 1002 to rotate in the opposite direction.

Figure 15:
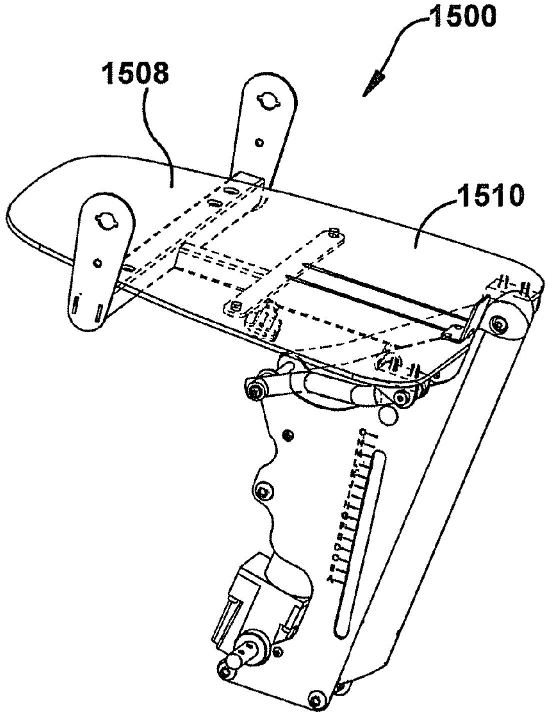
FIG. 15 is a perspective view of an exemplary embodiment of a seat that includes a flexible support surface that allows a portion of the support surface to move away from a user's leg(s) as the seat is moved from a seated orientation to a standing orientation.

FIG. 15 illustrates another embodiment of a seat 1500. The seat 1500 operates in substantially the same manner as the seat 500 described above. However, the rearward support portion 1508 and the forward support portion 1510 are formed of a single piece of flexible material, rather than by separate pieces 508, 510, of the seat 500 that are hingedly connected together. The flexibility of the single piece allows the forward support portion 1510 to move away from the user's leg(s) as the seat is moved between the seating and standing orientations without the use of hinges.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. For example, pivotal connections can be made of any number of structures including bearing assemblies, pins, nuts and bolts, and sleeve assemblies. Additionally, springs or shock absorbers can be added between pivoting and non-pivoting components to limit, dampen, or somewhat resist the pivotal motions of these components. Therefore, the invention, in its broader aspects, is not limited to the specific details, the representative apparatus, and illustrative examples shown and described. Accordingly, departures can be made from such details without departing from the spirit or scope of the applicant's general inventive concept.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, devices and components, hardware, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

The invention claimed is:

1. A standing frame comprising:

a frame;

a seat coupled to the frame such that the seat is moveable from a seating orientation configured to allow a user to sit on the seat to a standing orientation configured to at least partially support the user in a standing posture, wherein the seat includes:

a rearward support portion configured to engage the user's buttocks when the seat is in the seating orientation;

a middle portion fixed to the rearward support portion that extends forward from the rearward support portion to a pivotable connection between the middle portion and the frame such that the rearward support portion and the middle portion pivot together with respect to the frame to an upright position when the seat is moved to the standing orientation; and a forward support portion having first and second side portions disposed on opposite sides of the middle portion that are configured to engage the user's legs when the seat is in the seating orientation and to pivot with respect to the rearward support portion and the middle portion and thereby at least partially move away from the user's legs when the seat is in moved to the standing orientation.

2. The standing frame of claim 1 wherein the forward support portion is configured to automatically move away from the user's legs as the seat is moved from the seating orientation to the standing orientation.

3. The standing frame of claim 2 wherein a linkage coupled to the frame and to the forward support portion moves the forward support portion away from the user's legs as the seat is moved from the seating orientation to the standing orientation.

4. The standing frame of claim 1 wherein the rearward support portion is pivotably coupled to the frame to facilitate movement of the seat between the seating orientation and the standing orientation and the forward support portion is coupled to the frame to cause movement of the forward support portion with respect to the rearward support portion.

5. The standing frame of claim 4 wherein the forward support portion is pivotally coupled to the rearward support portion.

6. The standing frame of claim 1 further comprising a leg exercising apparatus coupled to the frame.

7. The standing frame of claim 6 wherein the leg exercising apparatus comprises a pair of footrests that are coupled to the frame such that the footrests are moveable to approximate movements associated with walking.

8. The standing frame of claim 7 wherein the footrests are coupled to an arm exercising apparatus.

9. An exercise apparatus comprising:

a frame;

a seat coupled to the frame such that the seat is moveable from a seating orientation configured to allow a user to sit on the seat to a standing orientation configured to at least partially support the user in a standing posture, wherein the seat includes:

a rearward support portion configured to engage the user's buttocks when the seat is in the seated orientation;

a middle portion fixed to the rearward support portion that extends forward from the rearward support portion to a pivotable connection between the middle portion and the frame such that the rearward support portion and the middle portion pivot together with respect to the frame to an upright position when the seat is moved to the standing orientation; and a forward support portion having first and second side portions disposed on opposite sides of the middle portion that are configured to engage the user's legs when the seat is in the seated orientation and to pivot with respect to the rearward support portion and the middle portion and thereby at least partially move away from the user's legs when the seat is moved to the standing orientation;

a leg exercising apparatus coupled to the frame, wherein the leg exercising apparatus comprises a pair of footrests that are coupled to the frame such that the footrests are moveable; and an arm exercising apparatus coupled to the leg exercising apparatus such that movement of the arm exercising apparatus causes movement of the leg exercising apparatus or movement of the leg exercising apparatus causes movement of the arm exercising apparatus.

10. The exercising apparatus of claim 9 wherein the forward support portion is configured to automatically move away from the user's legs as the seat is moved from the seating orientation to the standing orientation.

11. The exercising apparatus of claim 9 wherein a linkage coupled to the frame and to the forward support portion moves the forward support portion away from the user's legs as the seat is moved from the seating orientation to the standing orientation.

12. The exercising apparatus of claim 9 wherein the rearward support portion is pivotably coupled to the frame to facilitate movement of the seat between the seating orientation and the standing orientation and the forward support portion is coupled to the frame to facilitate movement of the forward support portion with respect to the rearward support portion.

13. The exercising apparatus of claim 12 wherein the forward support portion is pivotally coupled to the rearward support portion.

14. A standing frame comprising:

a frame;

a seat coupled to the frame such that the seat is moveable from a substantially horizontal seating orientation configured to allow a user to sit on the seat to a substantially vertical standing orientation configured to at least partially support the user in a standing posture, wherein the seat includes:

a rearward support portion having a support surface that is configured to engage the user's buttocks when the seat is in the seated position; and a forward support portion having a support surface that is configured to engage the upper portion of the user's legs when the seat is in the seated orientation;

wherein the support surface of the rearward support portion is in substantial alignment with the support surface of the forward support portion when the seat is in the seating orientation, the support surface of the rearward support portion is in substantial alignment with the support surface of the forward support portion when the seat is moved to an intermediate position that is approximately midway between the seating orientation and the standing orientation, and the forward support portion is pivoted with respect to the rearward support portion to move the support surface of the forward support portion away from the user's legs when the seat is moved from the intermediate position to the standing orientation.

15. The standing frame of claim 14 wherein the forward support portion is configured to automatically move away from the user's legs as the seat is moved from the intermediate position to the standing orientation.

16. The standing frame of claim 15 wherein a linkage coupled to the frame and to the forward support portion moves the forward support portion away from the user's legs as the seat is moved from the intermediate position to the standing orientation.

17. The standing frame of claim 14 wherein the rearward support portion is pivotably coupled to the frame to facilitate pivoting of the seat between the seating orientation and the standing orientation and the forward support portion is coupled to the frame to cause movement of the forward support portion with respect to the rearward support portion.

18. The standing frame of claim 17 wherein the forward support portion is pivotally coupled to the rearward support portion.

19. An exercise apparatus comprising:

a frame;

a seat coupled to the frame such that the seat is moveable from a substantially horizontal seating orientation configured to allow a user to sit on the seat to a substantially vertical standing orientation configured to at least partially support a user in a standing posture, wherein the seat includes:

a rearward support portion having a support surface that is configured to engage a user's buttocks when the seat is in the seated position and pivot with respect to the frame to an upright orientation when the seat is moved to the standing orientation; and a forward support portion having a support surface that is configured to engage a upper portion of the user's legs when the seat is in the seated position;

wherein the support surface of the rearward support portion is in substantial alignment with the support surface of the forward support portion when the seat is in the seating orientation, the support surface of the rearward support portion is in substantial alignment with the support surface of the forward support portion when the seat is moved to an intermediate position that is approximately midway between the seating orientation and the standing orientation, and the forward support portion is pivoted with respect to the rearward support portion to move the support surface of the forward support portion away from the user's legs when the seat is moved from the intermediate position to the standing orientation;

a leg exercising apparatus coupled to the frame, wherein the leg exercising apparatus comprises a pair of footrests that are coupled to the frame such that the footrests are moveable; and an arm exercising apparatus coupled to the leg exercising apparatus such that movement of the arm exercising apparatus causes movement of the leg exercising apparatus or movement of the leg exercising apparatus causes movement of the arm exercising apparatus.

20. The exercising apparatus of claim 19 wherein the forward support portion is configured to automatically move away from the user's legs as the seat is moved from the intermediate position to the standing orientation.

21. The exercising apparatus of claim 19 wherein a linkage coupled to the frame and to the forward support portion moves the forward support portion away from the user's legs as the seat is moved from the intermediate position to the standing orientation.

22. The exercising apparatus of claim 19 wherein the rearward support portion is pivotably coupled to the frame to facilitate movement of the seat between the seating orientation and the standing orientation and the forward support portion is coupled to the frame to facilitate movement of the forward support portion with respect to the rearward support portion.

23. The exercising apparatus of claim 22 wherein the forward support portion is pivotally coupled to the rearward support portion.

* * * * *